(12) United States Patent
Uchiyama et al.

(10) Patent No.: US 11,917,620 B2
(45) Date of Patent: *Feb. 27, 2024

(54) COMMUNICATION APPARATUS AND COMMUNICATION METHOD

(71) Applicant: SONY GROUP CORPORATION, Tokyo (JP)

(72) Inventors: Hiromasa Uchiyama, Tokyo (JP); Yifu Tang, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/559,369

(22) Filed: Dec. 22, 2021

(65) Prior Publication Data

US 2022/0116933 A1    Apr. 14, 2022

Related U.S. Application Data

(63) Continuation of application No. 16/635,591, filed as application No. PCT/JP2018/024031 on Jun. 25, 2018, now Pat. No. 11,229,015.

(30) Foreign Application Priority Data

Aug. 9, 2017  (JP) .................................. 2017-153812

(51) Int. Cl.
*H04W 72/20* (2023.01)
*H04W 76/15* (2018.01)
*H04W 72/23* (2023.01)

(52) U.S. Cl.
CPC ........... *H04W 72/20* (2023.01); *H04W 72/23* (2023.01); *H04W 76/15* (2018.02)

(58) Field of Classification Search
None
See application file for complete search history.

(56) References Cited

U.S. PATENT DOCUMENTS

| 10,306,599 B2 * | 5/2019 | Agiwal ................. H04W 72/51 |
| 2015/0264677 A1 | 9/2015 | He et al. |
| 2017/0353819 A1 * | 12/2017 | Yin ......................... H04W 4/70 |
| 2018/0115873 A1 | 4/2018 | Aminaka |
| 2020/0029353 A1 * | 1/2020 | Xu ........................ H04W 72/21 |

(Continued)

FOREIGN PATENT DOCUMENTS

| RU | 2707175 C2 | 11/2019 |
| WO | 2016/147235 A1 | 9/2016 |
| WO | 2016/152096 A1 | 9/2016 |

OTHER PUBLICATIONS

"FeD2D Resource Scheme", ZTE, 3GPP TSG RAN WG1, 89th Meeting, Hangzhou, P.R. China, R1-1707209, May 15-19, 2017, 04 pages.

(Continued)

*Primary Examiner* — Hong S Cho
(74) *Attorney, Agent, or Firm* — CHIP LAW GROUP

(57) ABSTRACT

To achieve higher-quality FeD2D communication. A communication apparatus including a communication unit that performs a wireless communication, and a control unit that performs a control to cause control information regarding allocation of a resource for a communication with a first apparatus via a first wireless link to be notified to a second apparatus via a second wireless link.

24 Claims, 23 Drawing Sheets

(56) References Cited

U.S. PATENT DOCUMENTS

2020/0236666 A1* 7/2020 Yu .................... H04L 1/1812

OTHER PUBLICATIONS

Office Action for RU Patent Application No. 2020104351, dated Sep. 27, 2021, 05 pages of English Translation and 06 pages of Office Action.

"Sidelink Resource Allocation and Configuration for Wearable and IoT Use Cases", Intel Corporation, R1-1707333, 3GPP TSG RAN WG1, 89th Meeting, Hangzhou, P.R. China, May 15-19, 2017, 08 pages.

"Issues on multiplexing of WAN and D2D", LG Electronics, R1-141354, 3GPP TSG RAN WG1, 76bis Meeting, Shenzhen, China, Mar. 31-Apr. 4, 2014, 10 pages.

International Search Report and Written Opinion of PCT Application No. PCT/JP2018/024031, dated Aug. 28, 2018, 06 pages of English Translation and 07 pages of ISRWO.

International Preliminary Report on Patentability of PCT Application No. PCT/JP2018/024031, dated Feb. 20, 2020, 07 pages of English Translation and 04 pages of IPRP.

Non-Final Office Action for U.S. Appl. No. 16/635,591, dated Jun. 1, 2021, 08 pages.

Notice of Allowance for U.S. Appl. No. 16/635,591, dated Sep. 20, 2021, 05 pages.

Notice of Allowance for U.S. Appl. No. 16/635,591, dated Dec. 13, 2021, 02 pages.

"Sidelink Resource Allocation and Configuration for Wearable and IoT Use Cases", Intel Corporation, 3GPP TSG RAN WG1, 89th Meeting, R1-1707333, Hangzhou, P.R. China, May 15-19, 2017, 08 pages.

"FeD2D Resource Scheme", ZTE, 3GPP TSG RAN WG1, 89th Meeting, R1-1707209, Hangzhou, P.R. China, May 15-19, 2017, 04 pages.

Office Action for EP Patent Application No. 18845079.5, dated Mar. 9, 2022, 08 pages of Office Action.

* cited by examiner

[FIG. 1]
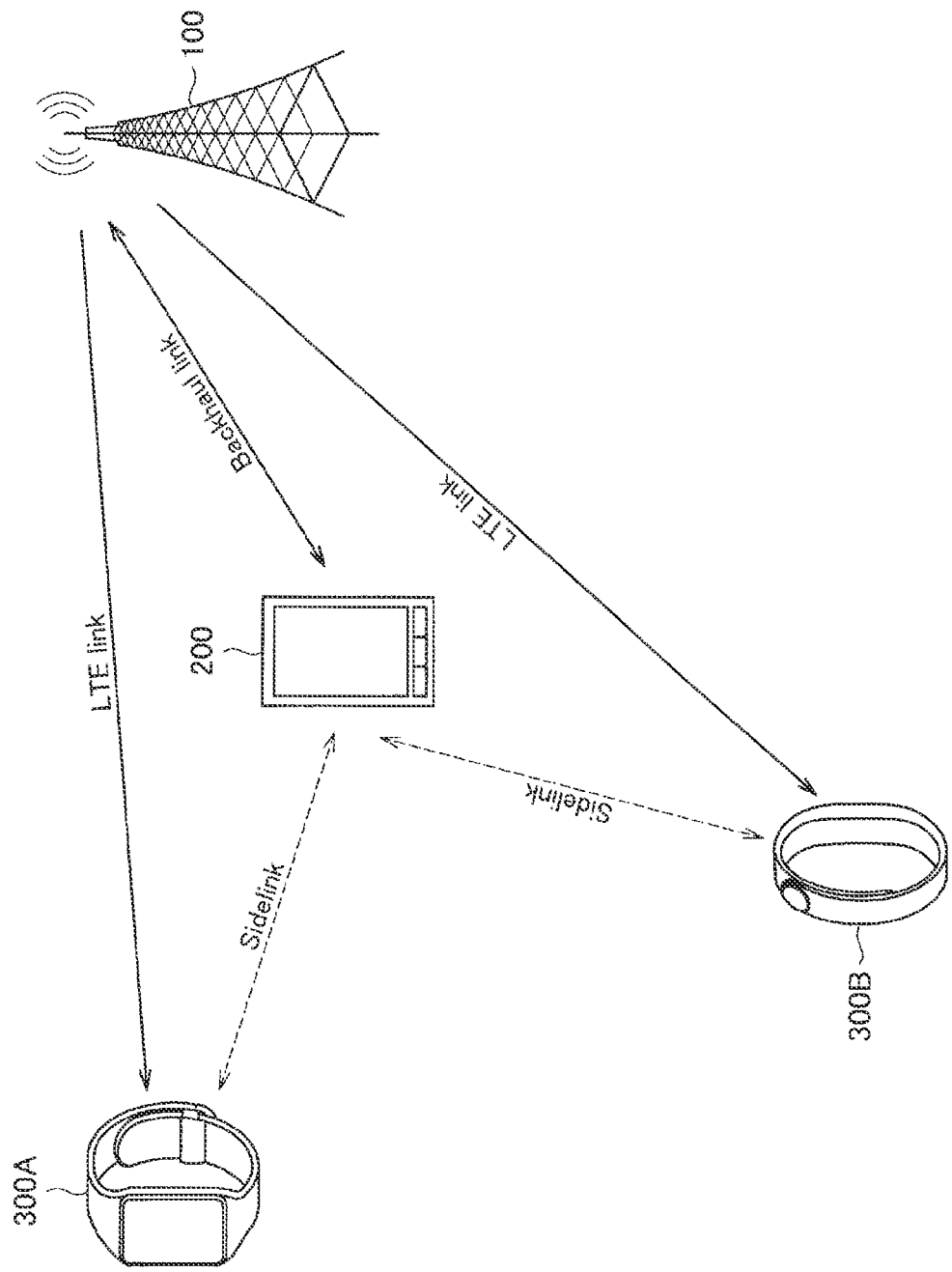

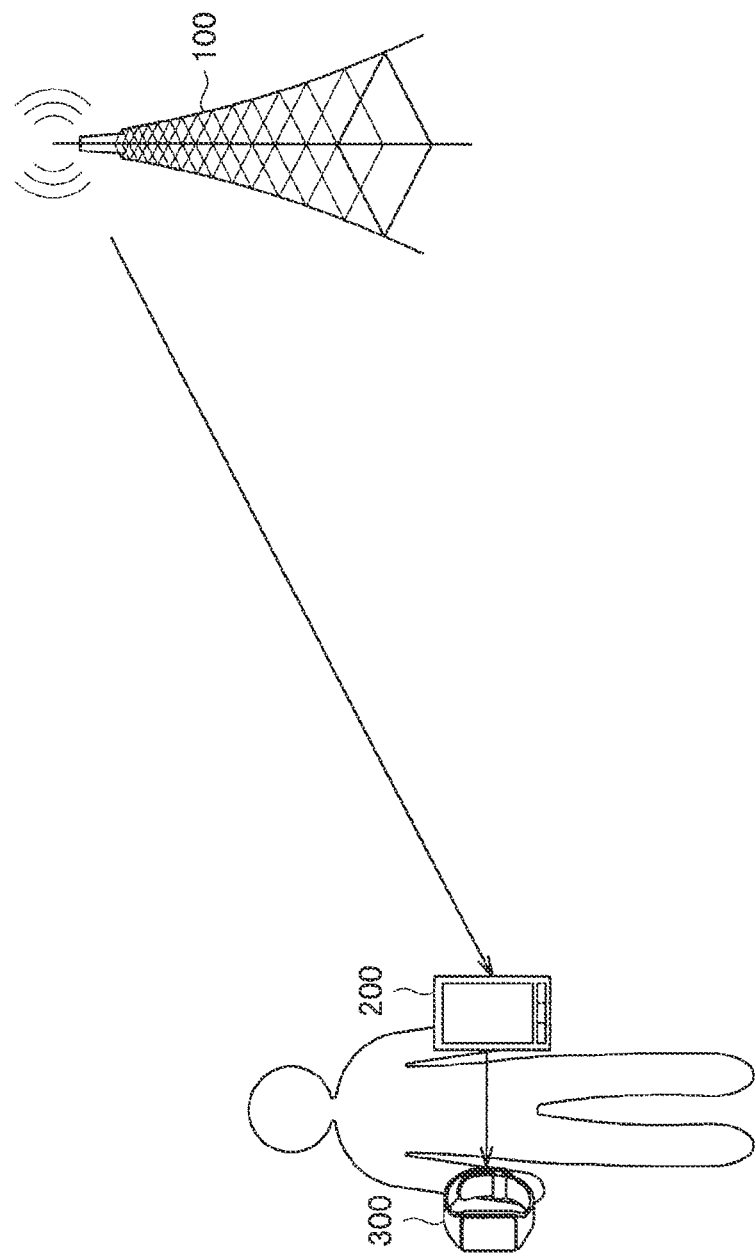
[FIG. 2]

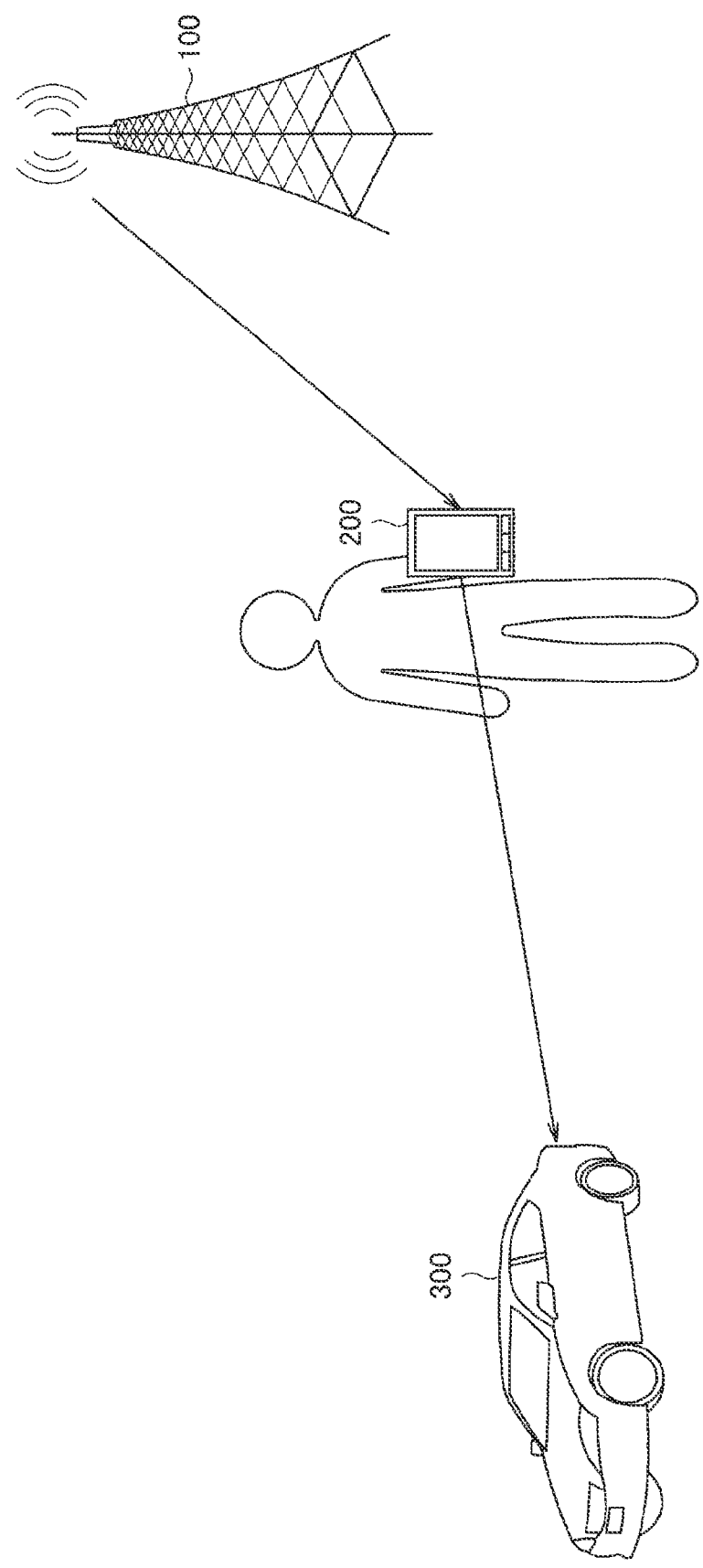
[FIG. 3]

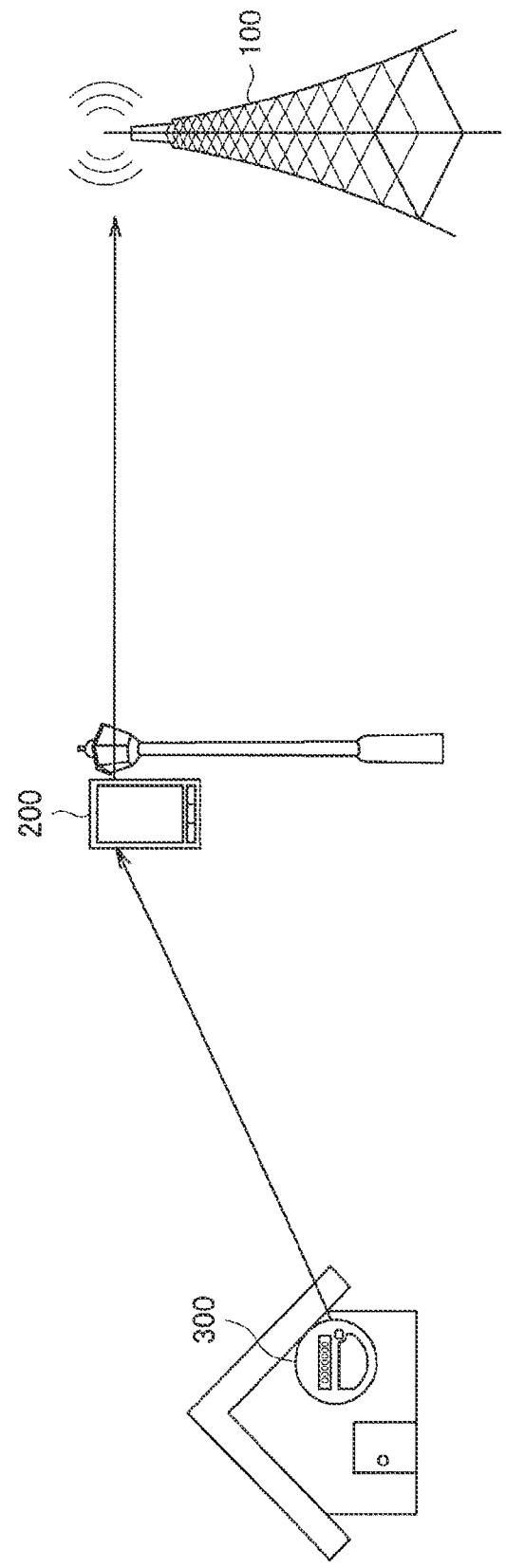
[FIG. 4]

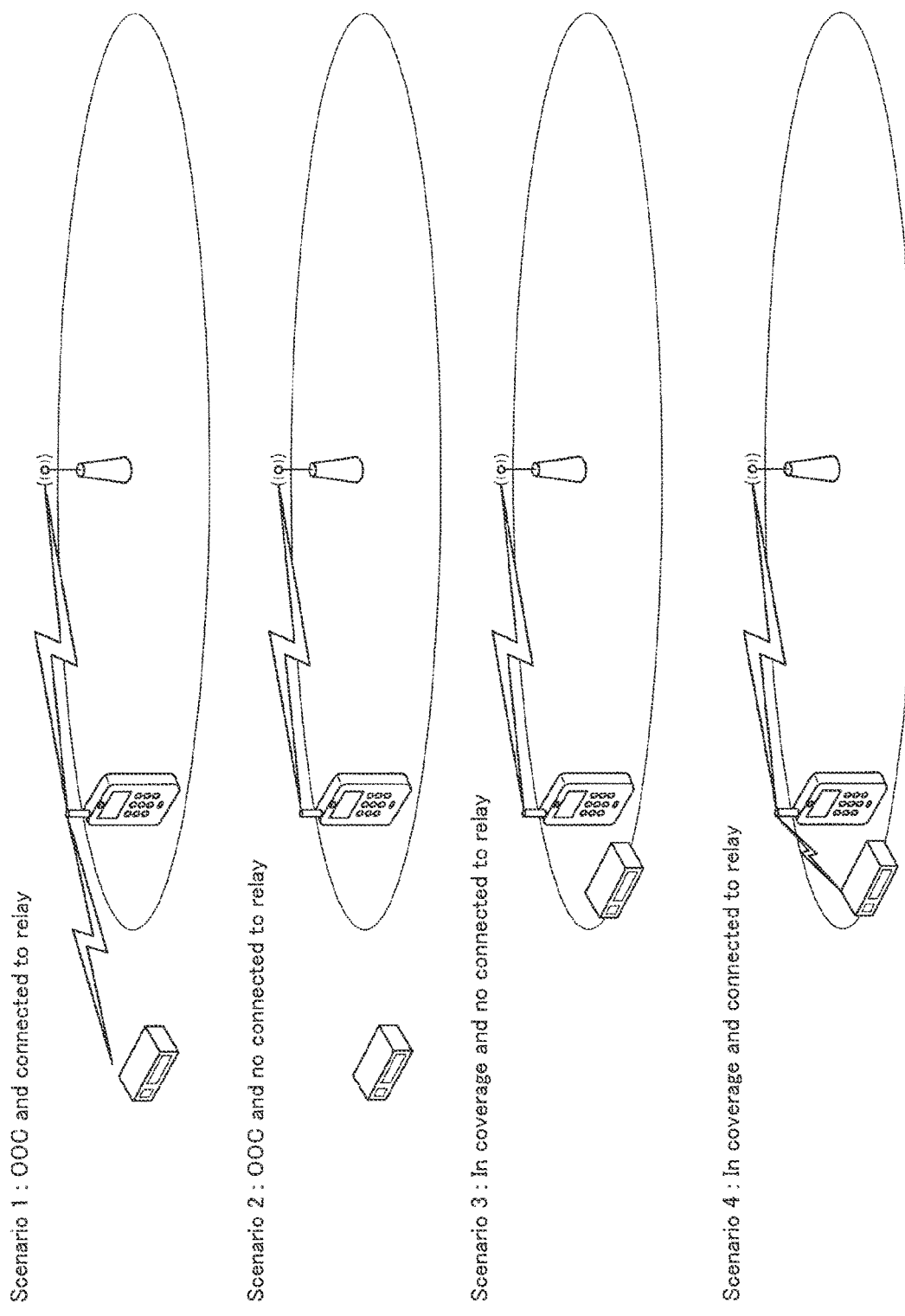

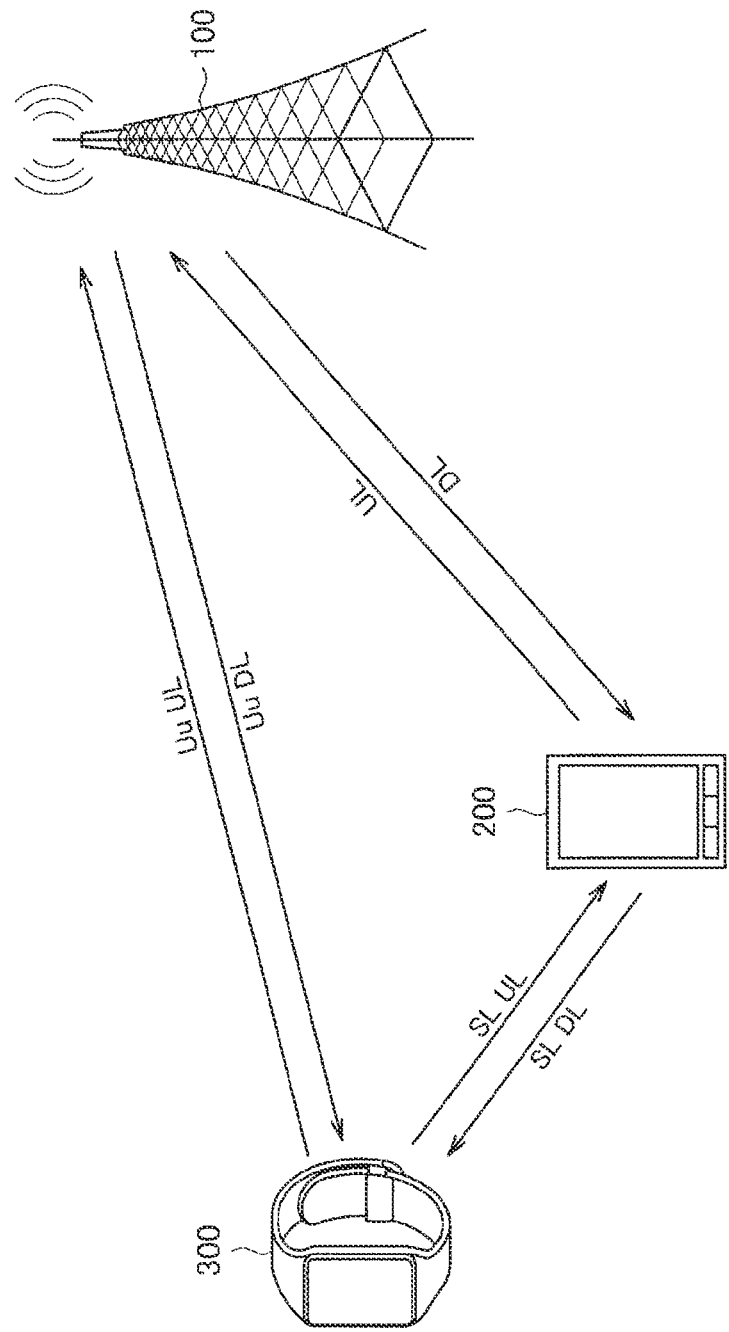
[FIG. 6]

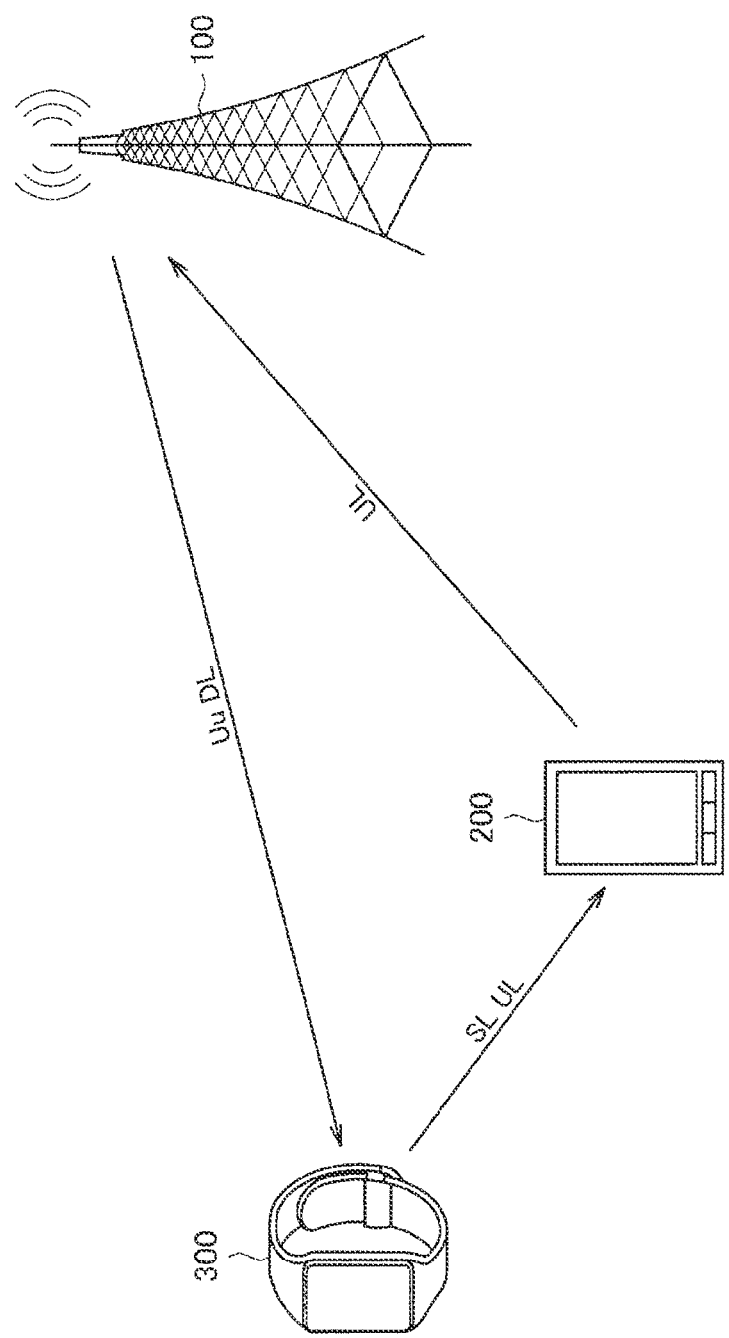
[FIG. 7]

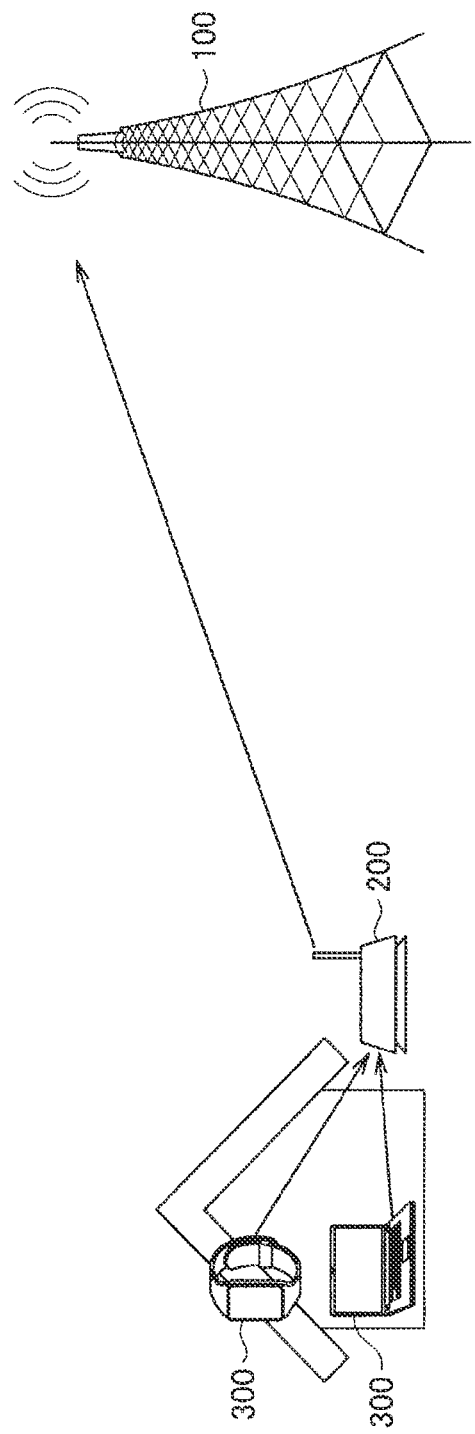
[FIG. 8]

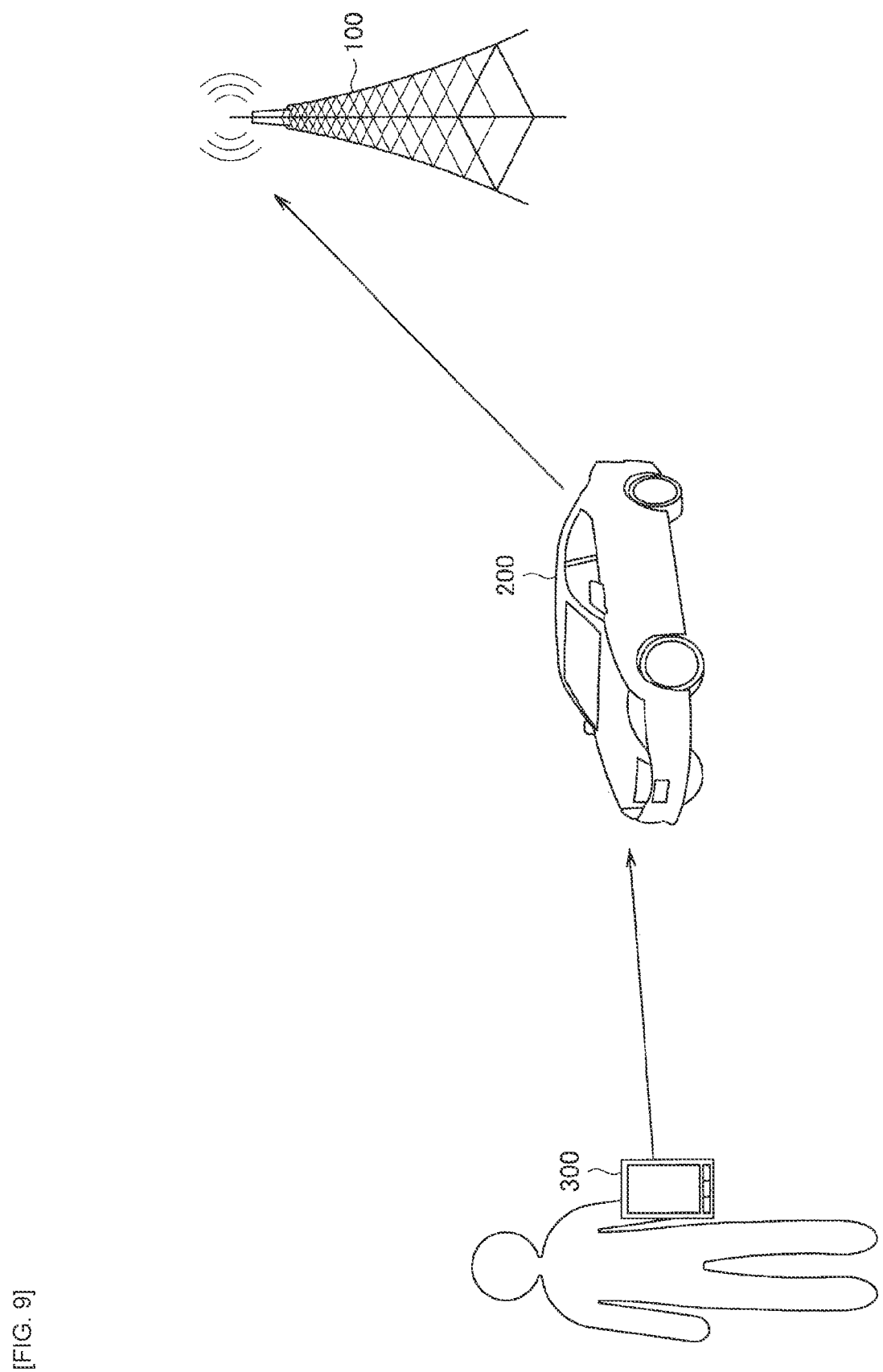
[FIG. 9]

[FIG. 10]
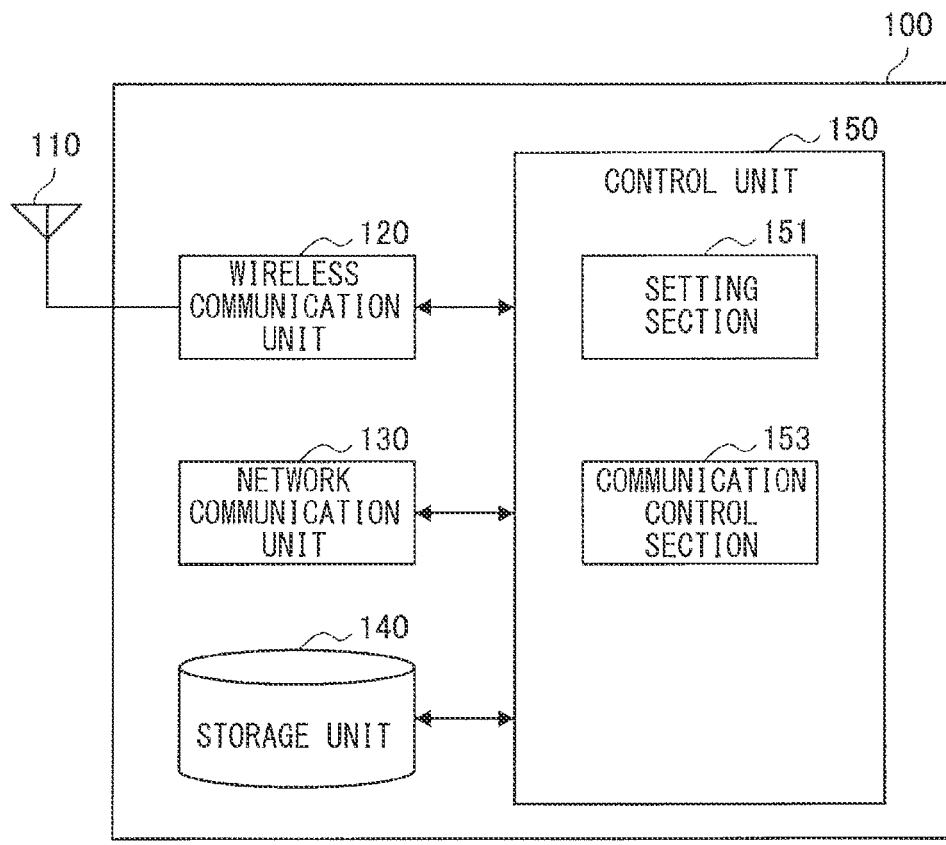
[FIG. 11]
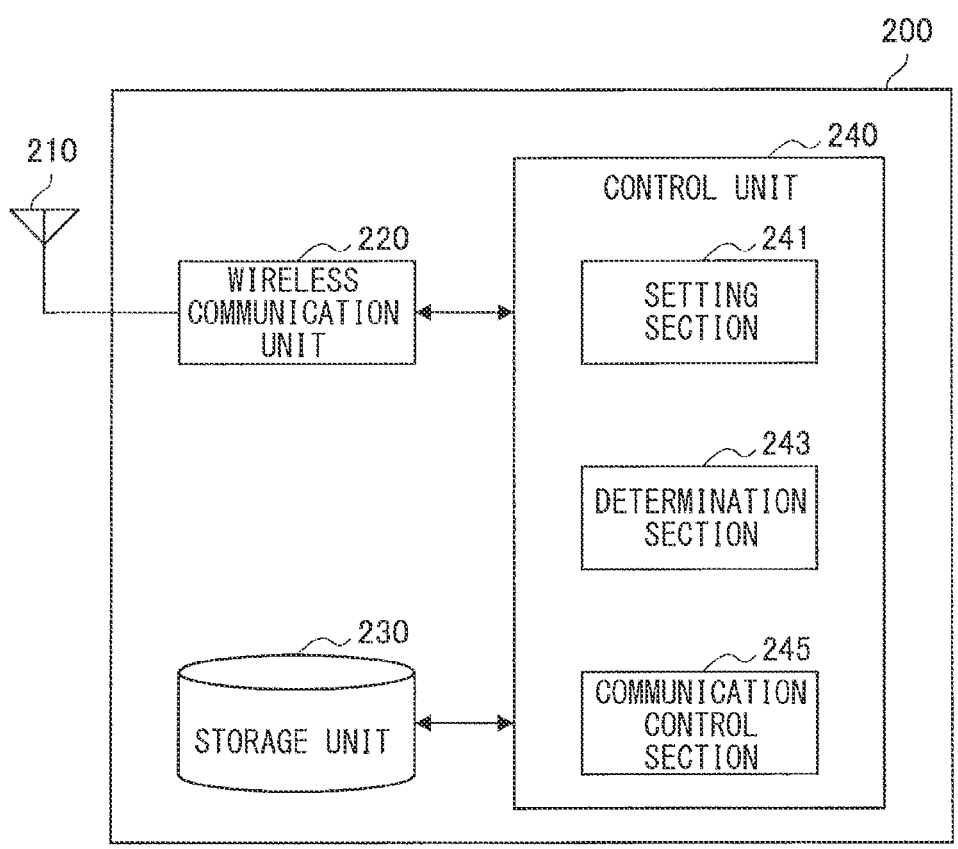

[FIG. 12]
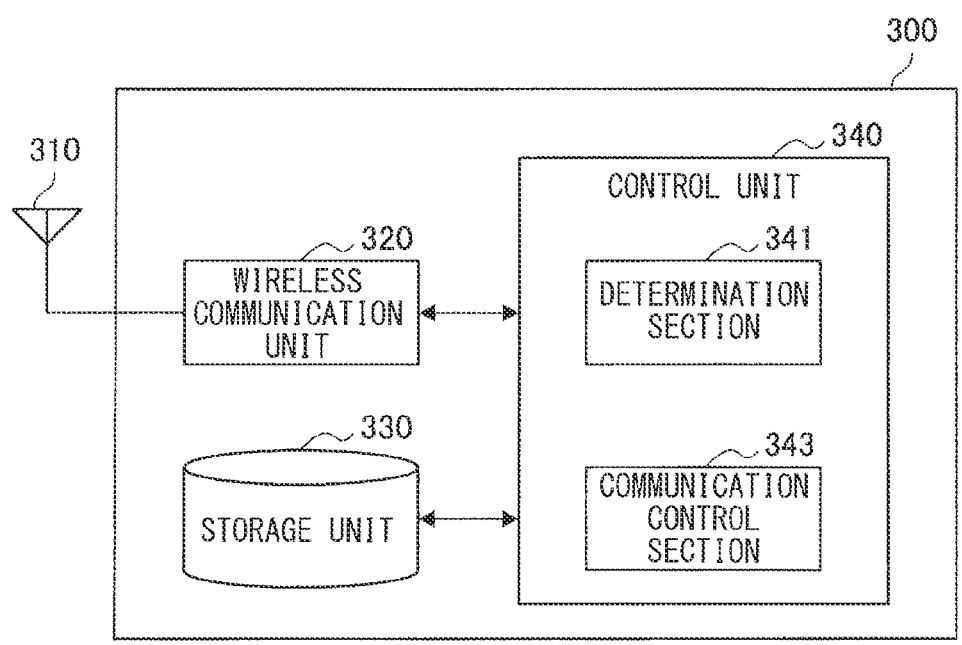

[FIG. 13]
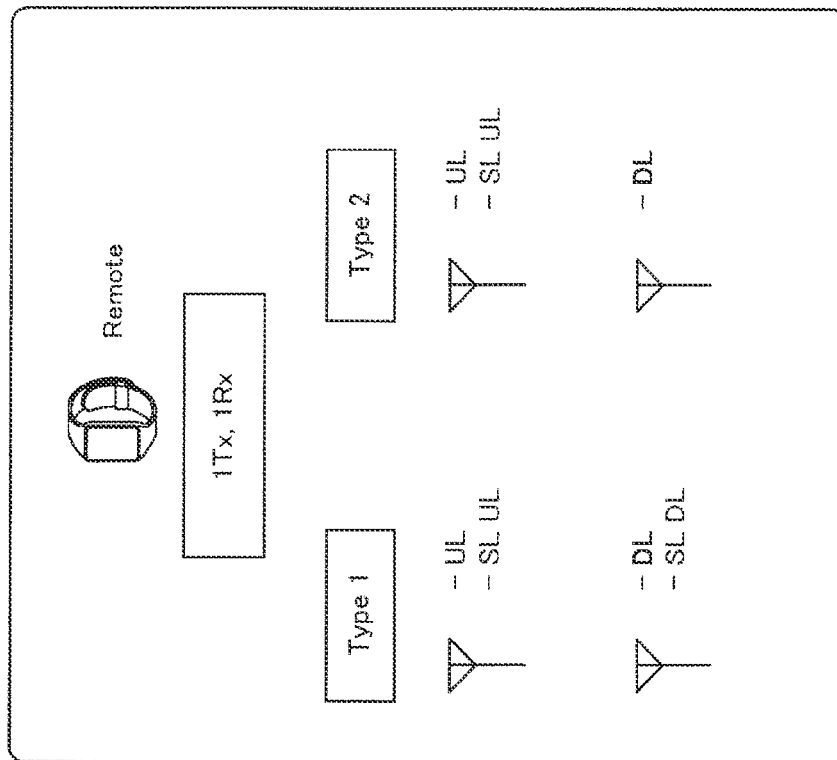
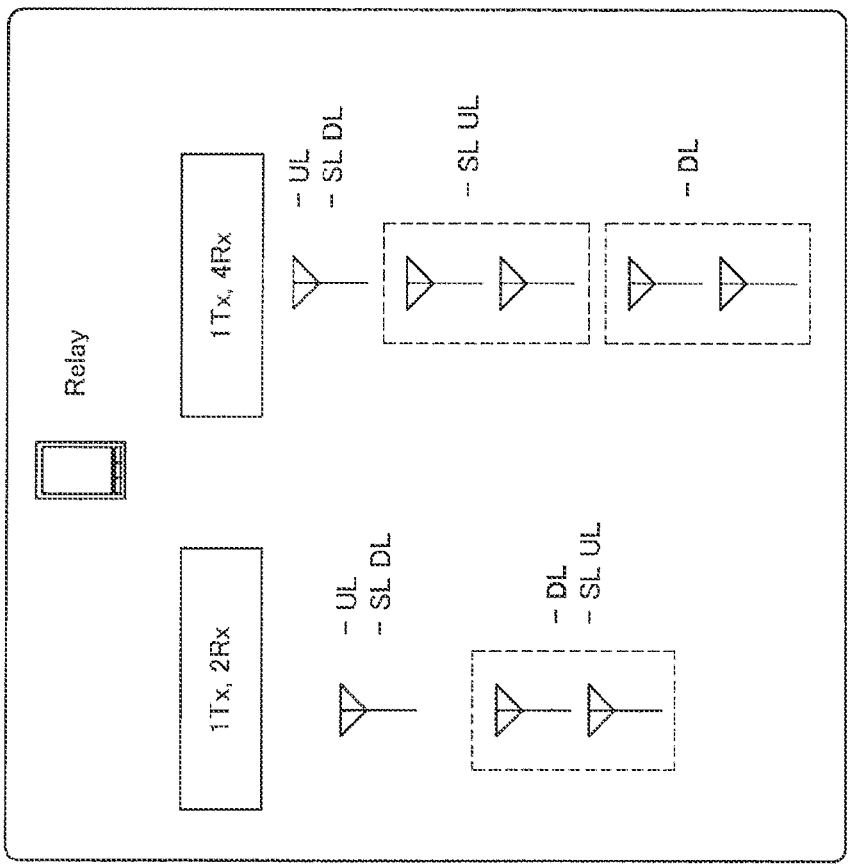

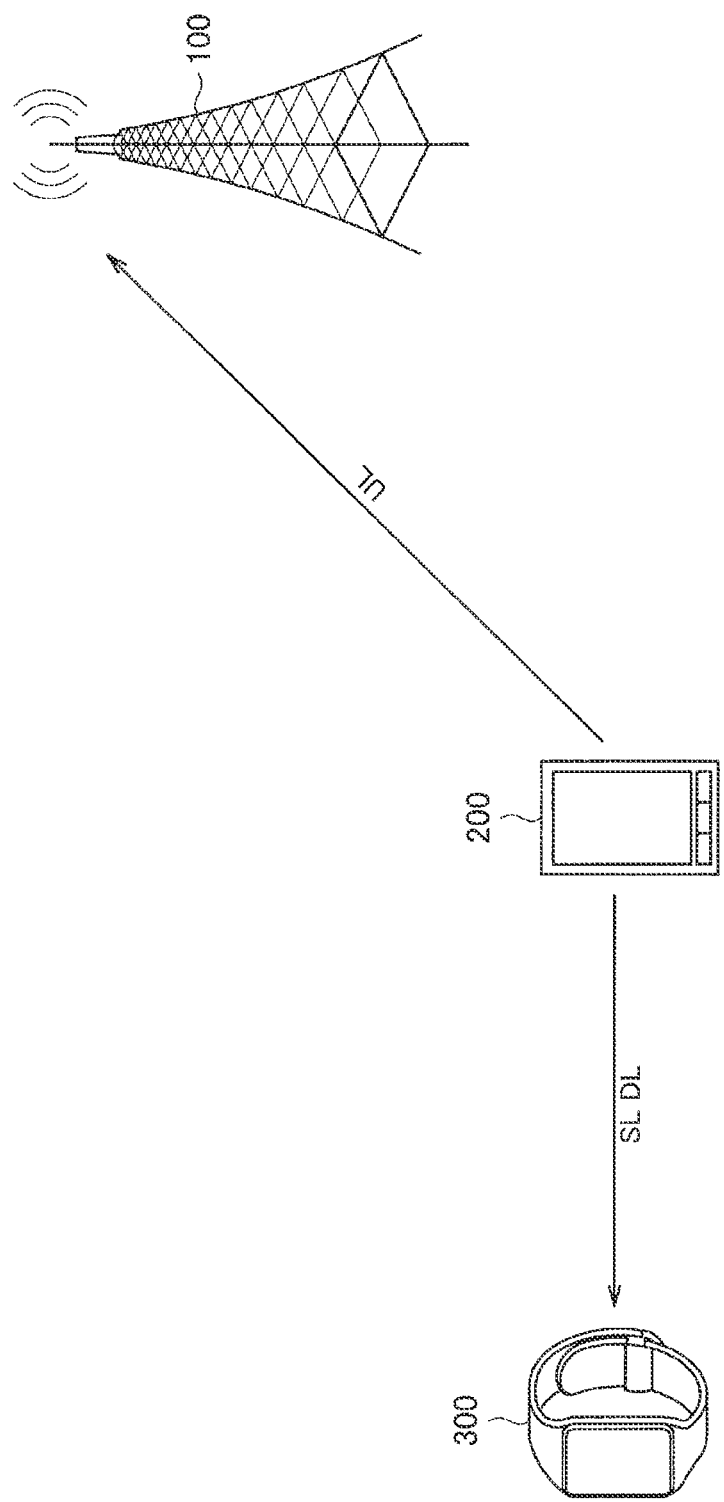
[FIG. 14]

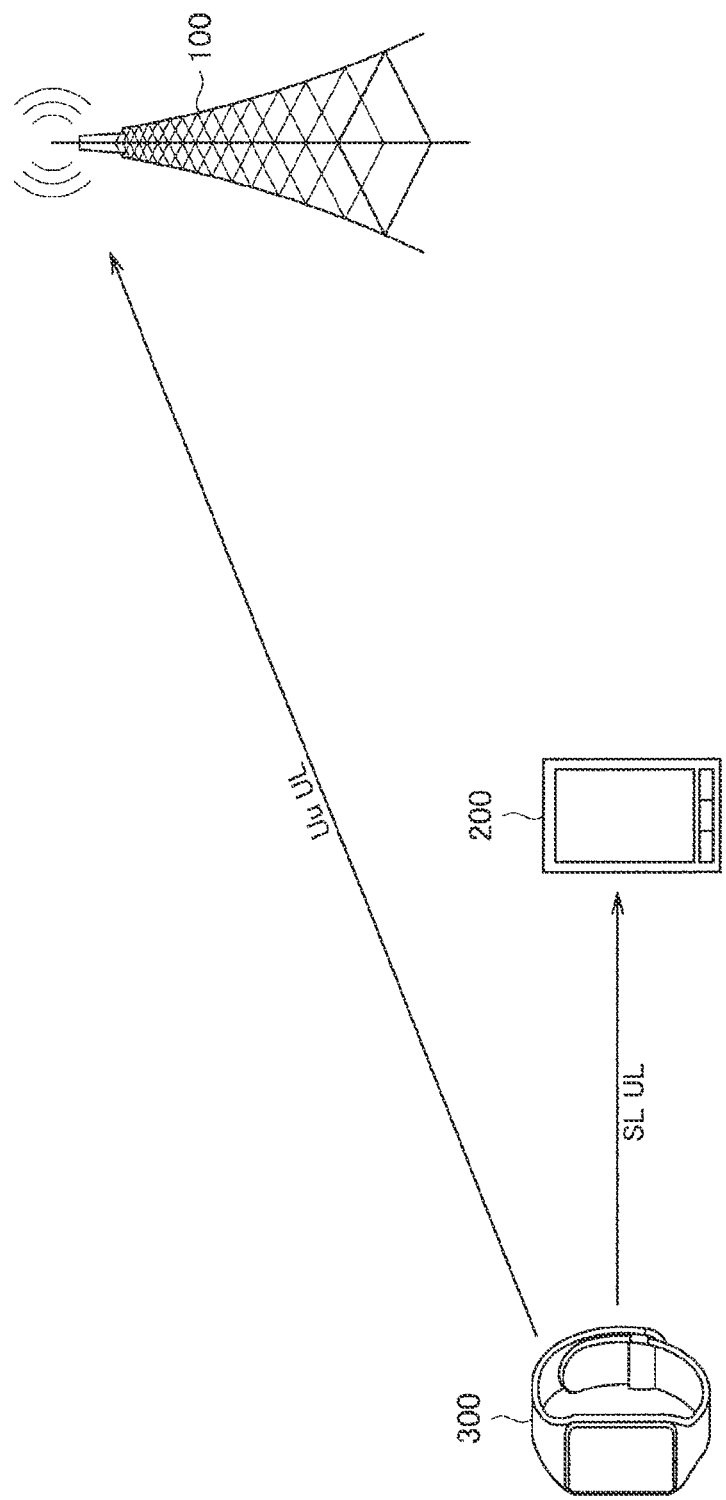
[FIG. 15]

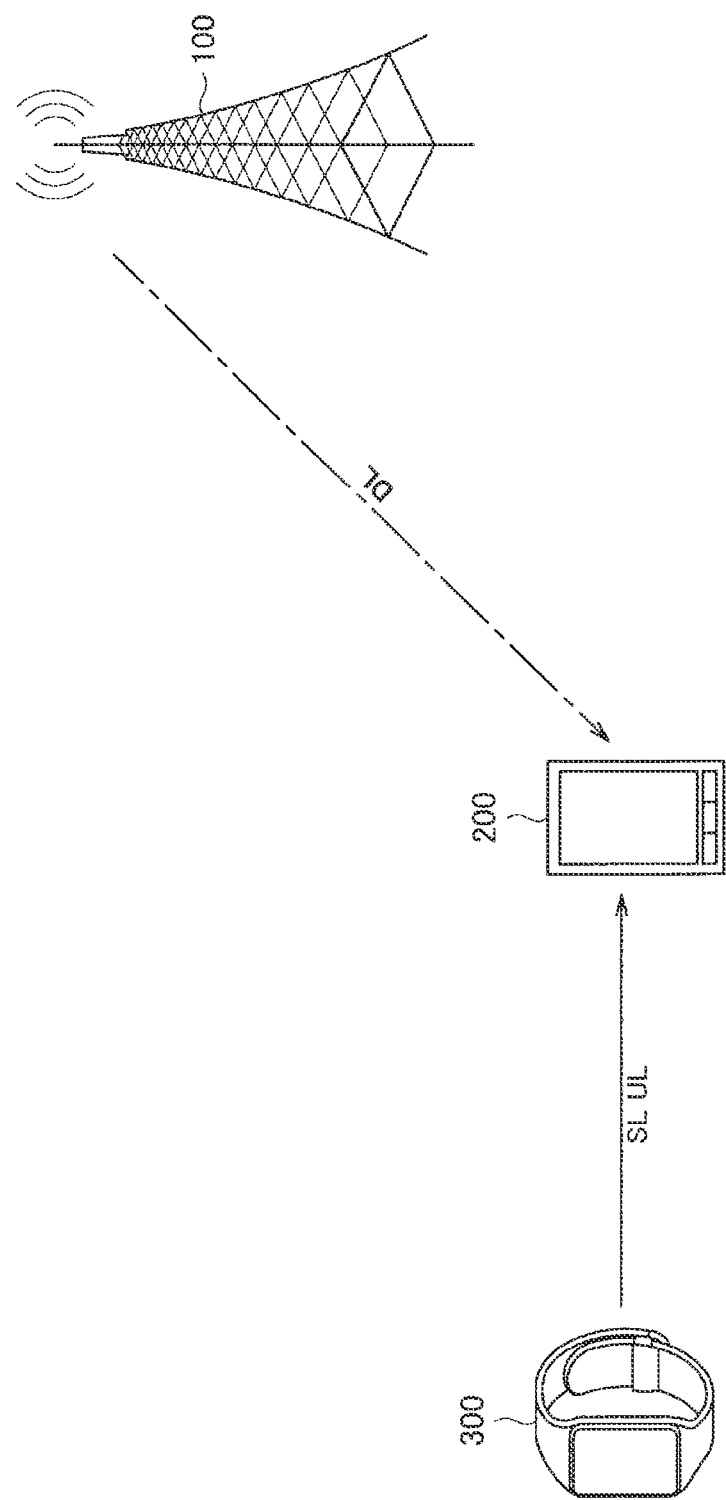
[FIG. 16]

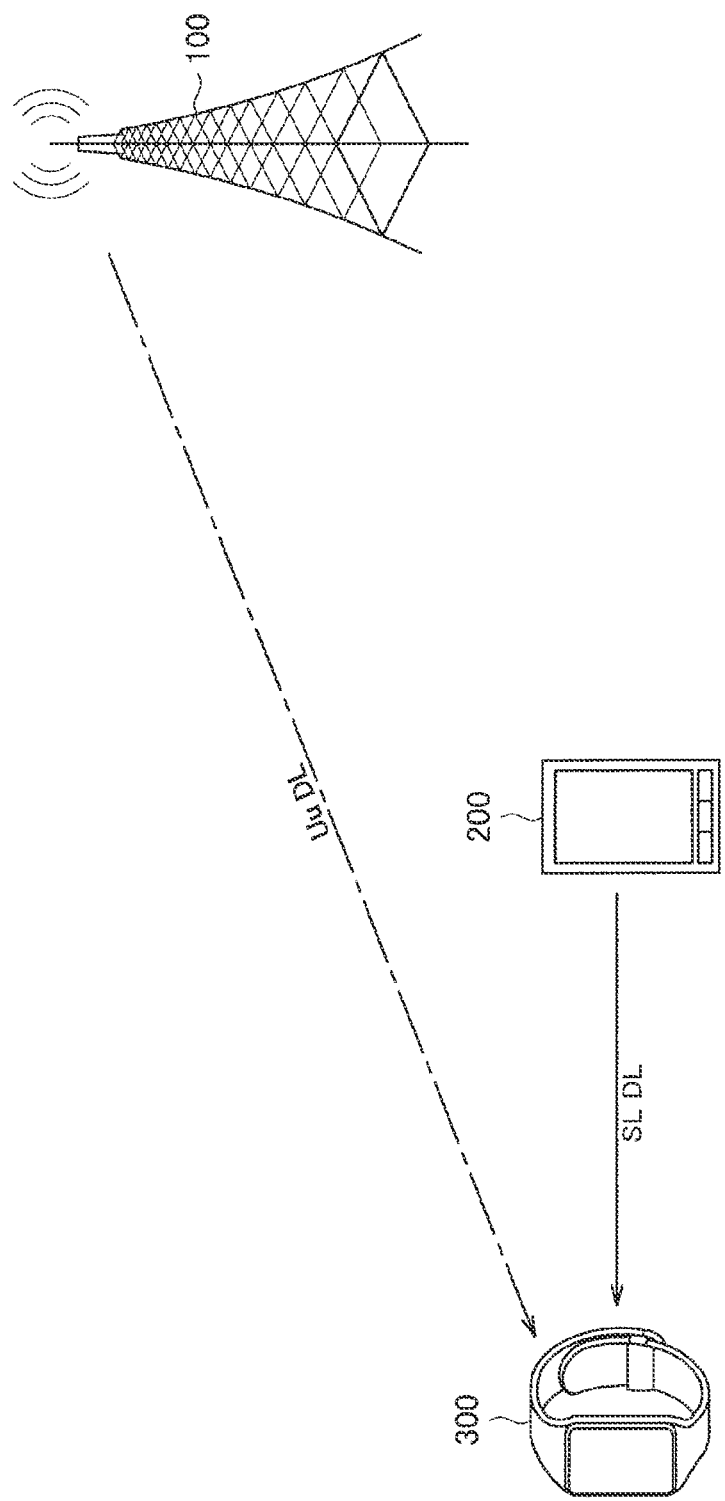
[FIG. 17]

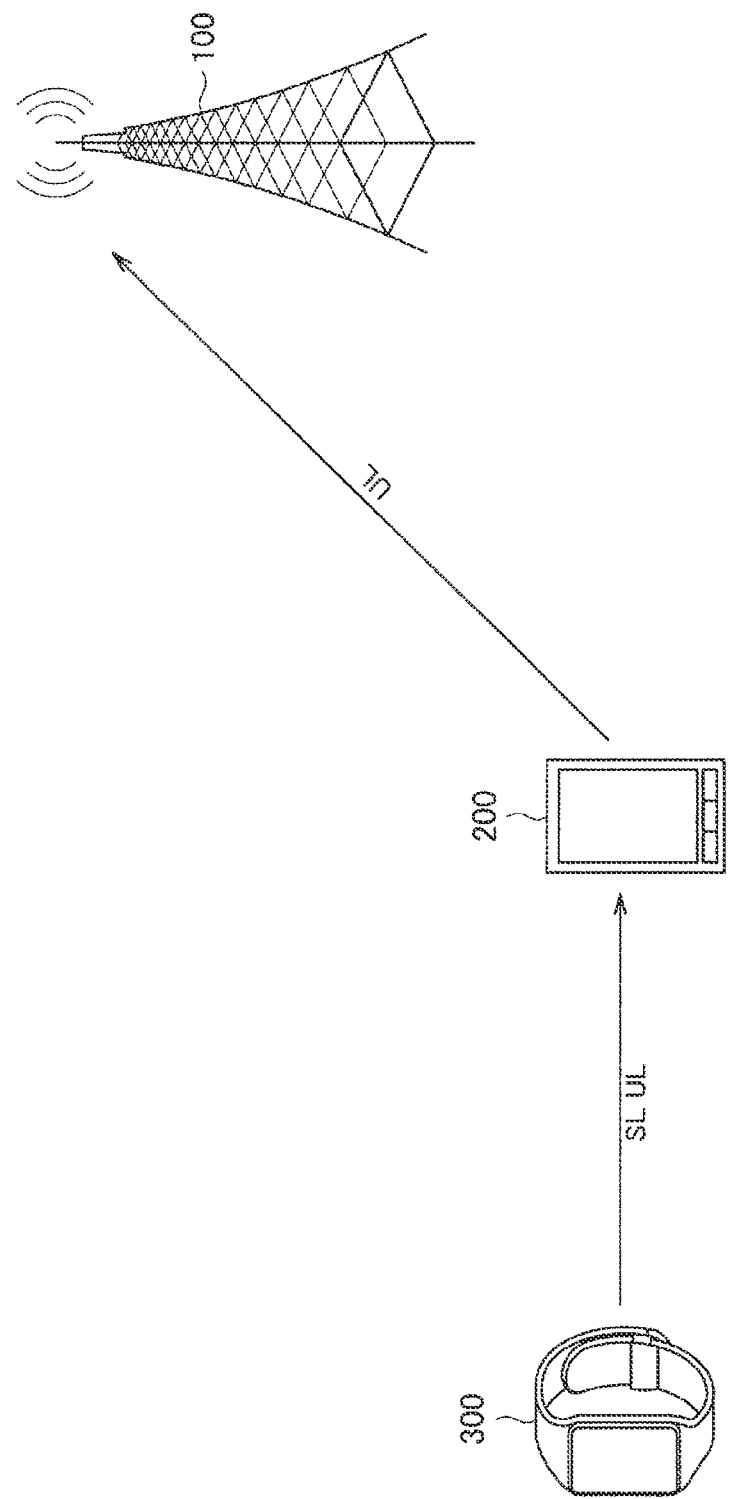
[FIG. 18]

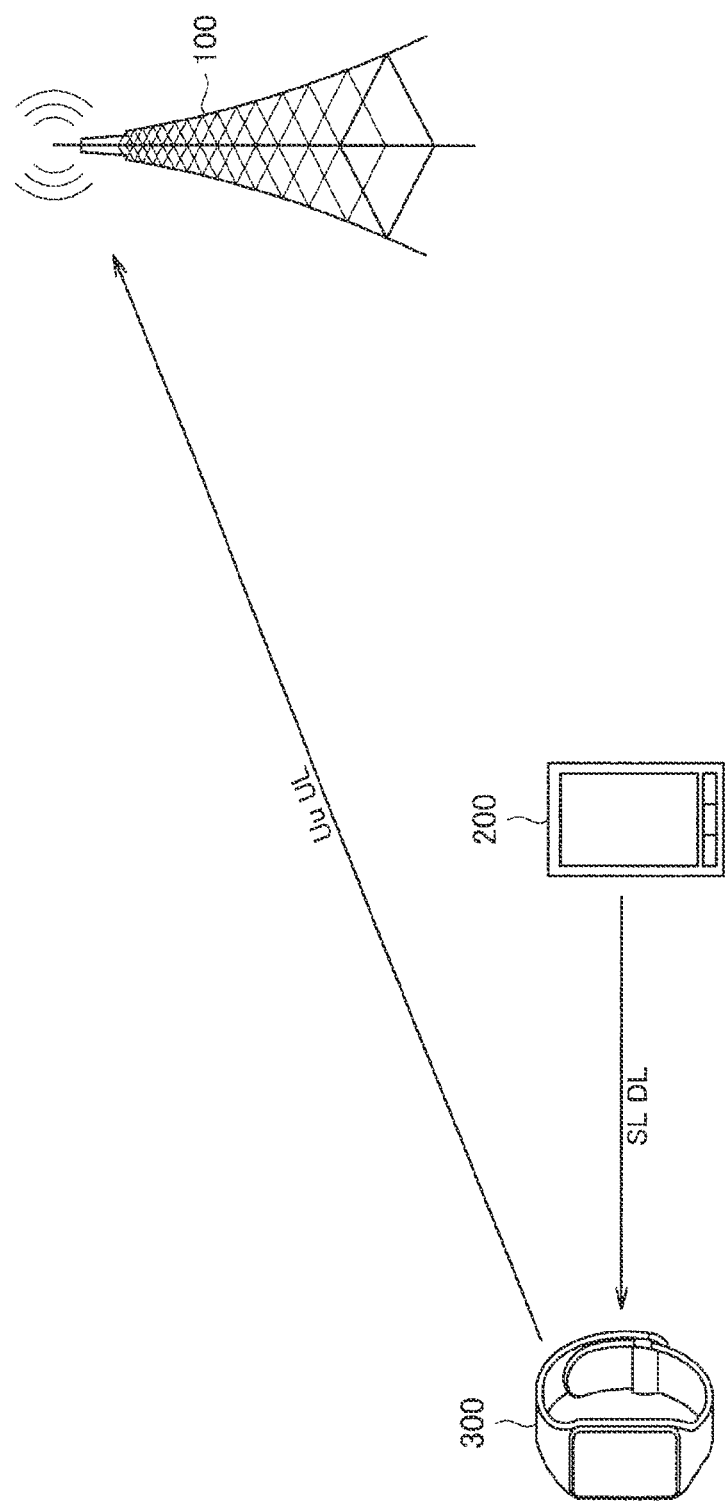
[FIG. 19]

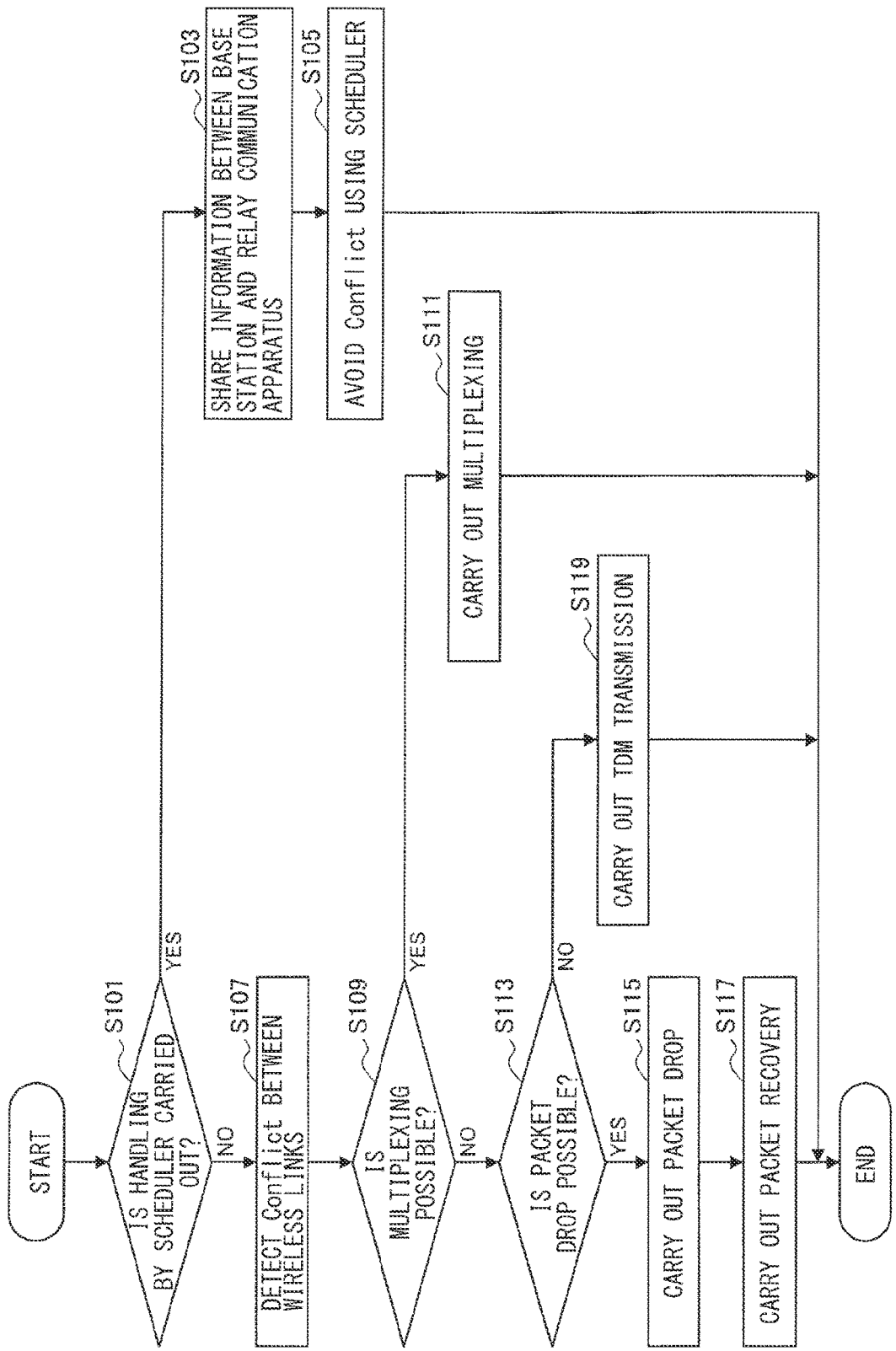
[FIG. 20]

[FIG. 21]
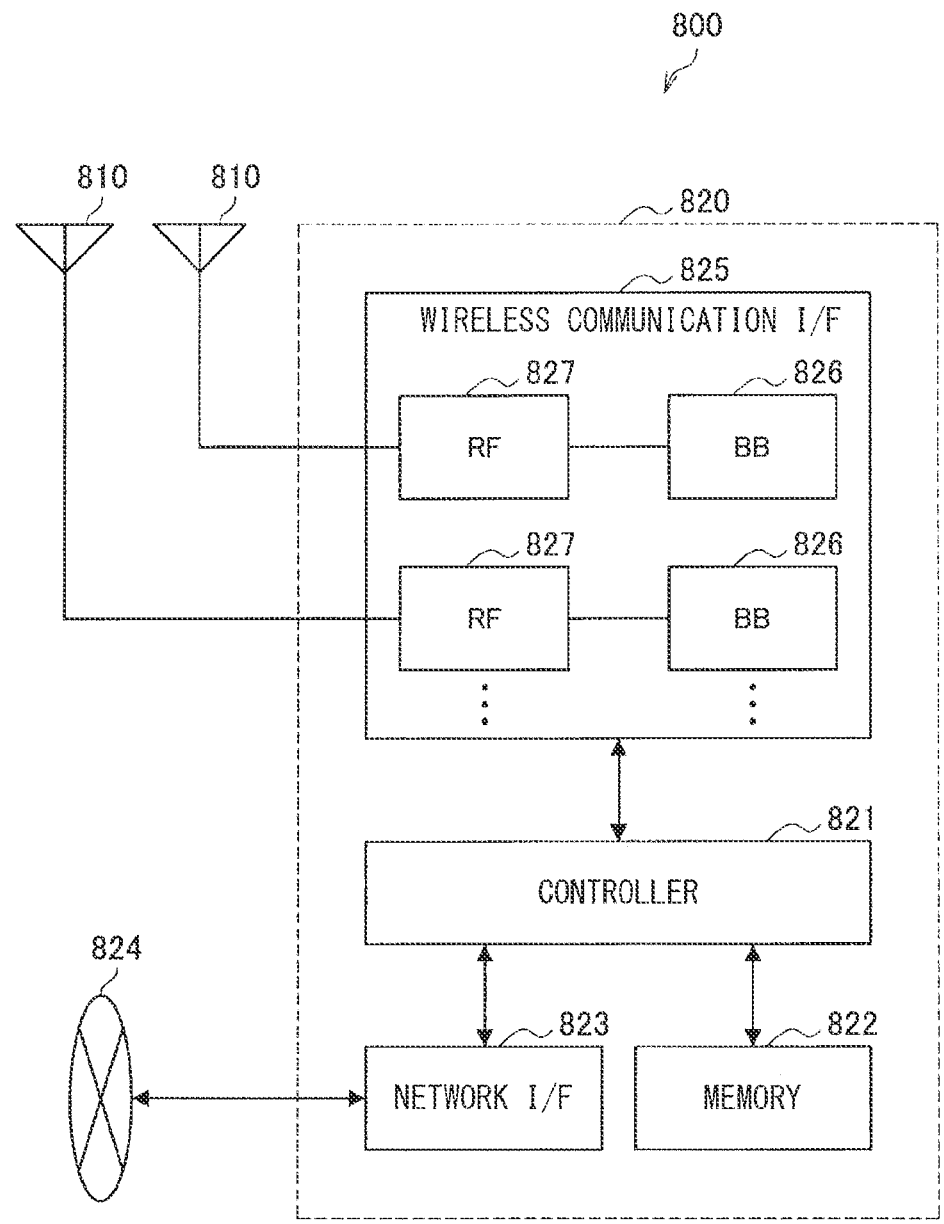

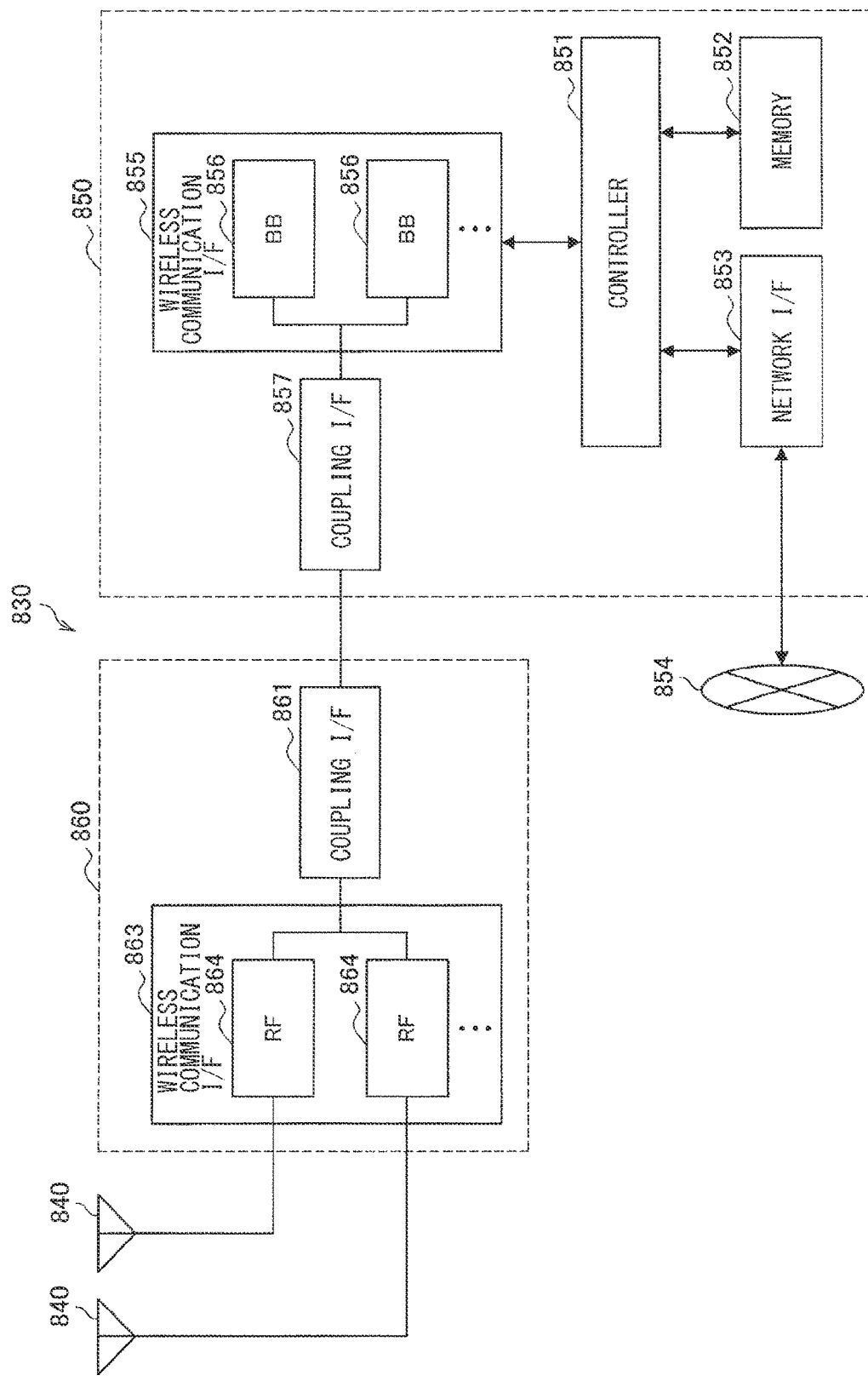
[FIG. 22]

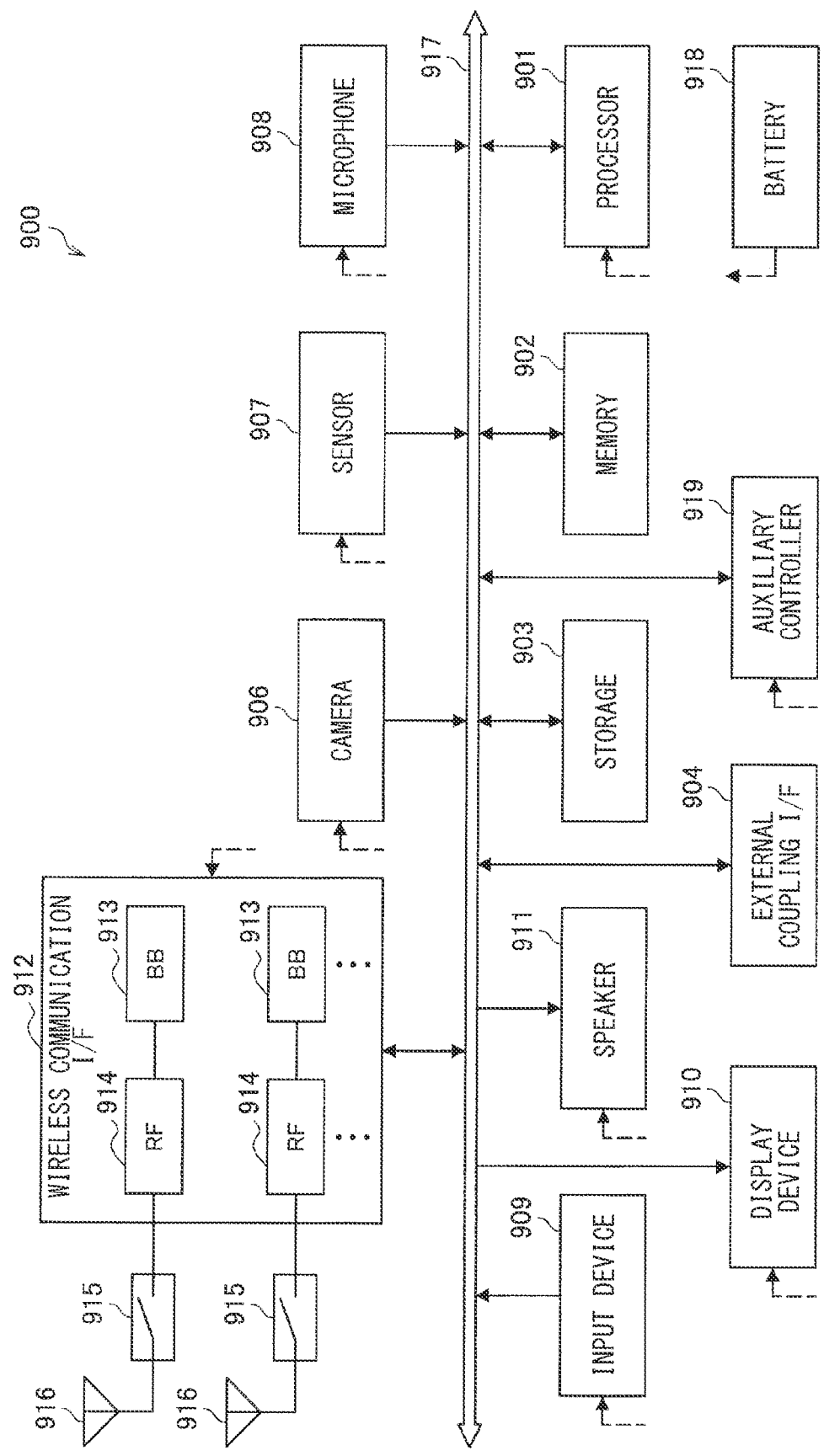

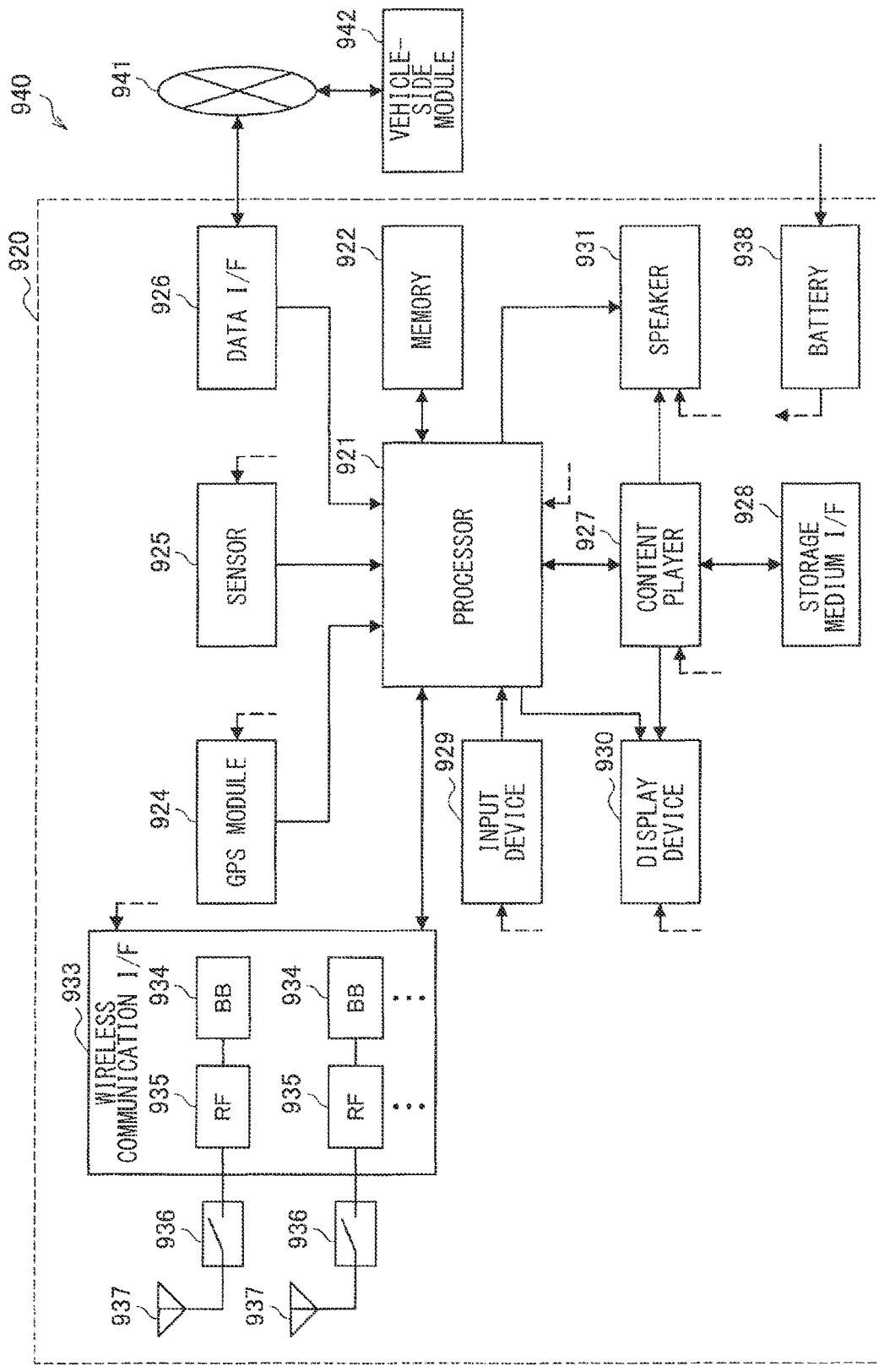

COMMUNICATION APPARATUS AND COMMUNICATION METHOD

CROSS REFERENCE TO RELATED APPLICATIONS

The present application is a continuation application of U.S. patent application Ser. No. 16/635,591, filed Jan. 31, 2020, which is a National Phase of International Patent Application No. PCT/JP2018/024031 filed on Jun. 25, 2018, which claims the benefit of priority from Japanese Patent Application No. 2017-153812 filed in the Japan Patent Office on Aug. 9, 2017. Each of the above-referenced applications is hereby incorporated herein by reference in its entirety.

TECHNICAL FIELD

The present disclosure relates to a communication apparatus and a communication method.

BACKGROUND ART

In recent years, research and development related to IoT (Internet of Things) have been actively carried out. In the IoT, various items are coupled to a network to exchange information, and thus a wireless communication is an important technical theme. Accordingly, in 3GPP (Third Generation Partnership Project), communication for the IoT, such as MTC (Machine Type Communication) and NB-IoT (Narrow Band IoT), is standardized. In particular, low-cost terminals for the IoT are expected to be enhanced in the future because low-power-consumption communication becomes important.

A typical example of the low-cost terminal is a wearable terminal. In the wearable terminal, low power consumption, highly reliable communication, and sometimes large-capacity communication are required. In order to cover such use cases, standardization of FeD2D (Further enhancement D2D) has been started in the 3GPP in 2016. The wearable terminal is typically present in the vicinity of a user himself or herself, and thus applying relay communication utilizing a user terminal such as smartphone as a relay communication apparatus makes it possible to shorten a communication distance and thus to achieve highly reliable communication with low power consumption. It is to be noted that NPTL 1 and NPTL 2 disclose techniques related to the FeD2D.

CITATION LIST

Non-Patent Literature

NPTL 1: LG ELECTRONICS, "Issues on multiplexing of WAN and D2D", R1-141354, 3GPP TSG RAN WG1 MEETING #76BIS, Shenzhen, China, 31 Mar.-4 Apr. 2014

NPTL 2: Intel Corporation, "Sidelink Resource Allocation and Configuration for Wearable and IoT Use Cases", R1-1707333, 3GPP TSG RAN WG1 Meeting #89, Hangzhou, P. R. China 15th-19 May 2017

SUMMARY OF THE INVENTION

Problem to be Solved by the Invention

Incidentally, in FeD2D, a remote communication apparatus and a relay communication apparatus perform transmission and reception for each of a direct link to and from a base station apparatus and a side link. Meanwhile, in a terminal apparatus applied as the remote communication apparatus or the relay communication apparatus, there is a case where a transmission device or a reception device may be limited that is available for a communication with the apparatuses via wireless links. Under such circumstances, in FeD2D communication, there are cases where a plurality of communications may be performed via mutually different wireless links and where a conflict (conflict) in the transmitting apparatus or the reception device may occur between the plurality of communications.

Therefore, the present disclosure proposes a technique that makes it possible to achieve higher-quality FeD2D communication.

Means for Solving the Problem

According to the present disclosure, there is provided a communication apparatus including a communication unit that performs a wireless communication, and a control unit that performs a control to cause control information regarding allocation of a resource for a communication with a first apparatus via a first wireless link to be notified to a second apparatus via a second wireless link.

In addition, according to the present disclosure, there is provided a communication method including causing a computer to perform a wireless communication, and perform a control to cause information regarding a resource allocated for a communication with a first apparatus via a first wireless link to be notified to a second apparatus via a second wireless link.

Effect of the Invention

As described above, according to the present disclosure, there is provided a technique that makes it possible to achieve higher-quality FeD2D communication.

It is to be noted that the above-described effects are not necessarily limitative. In addition to or in place of the above effects, there may be achieved any of the effects described in the present specification or other effects that may be grasped from the present specification.

BRIEF DESCRIPTION OF THE DRAWINGS

FIG. 1 is an explanatory diagram of an example of a configuration of a system according to an embodiment of the present disclosure.

FIG. 2 illustrates an example of a communication environment assumed in relay communication utilizing a wearable terminal as a remote communication apparatus.

FIG. 3 illustrates an example of a communication environment assumed in relay communication utilizing a wearable terminal as a remote communication apparatus.

FIG. 4 illustrates an example of a use case of MTC.

FIG. 5 illustrates an example of a coverage scenario that may be assumed in FeD2D.

FIG. 6 is an explanatory diagram for explaining a relay type in the FeD2D.

FIG. 7 is an explanatory diagram for explaining a relay type in the FeD2D.

FIG. 8 is an explanatory diagram for explaining an example of deployment in a case where the FeD2D is applied to home access point communication.

FIG. 9 is an explanatory diagram for explaining an example of deployment in a case where the FeD2D is achieved by utilizing a mobile object as a relay UE.

FIG. 10 is a block diagram illustrating an example of a configuration of a base station apparatus according to the embodiment.

FIG. 11 is a block diagram illustrating an example of a configuration of a relay UE according to the embodiment.

FIG. 12 is a block diagram illustrating an example of a configuration of a remote UE according to the embodiment.

FIG. 13 is an explanatory diagram for explaining an example of a configuration of a transmission device and a reception device in the relay UE and the remote UE.

FIG. 14 is an explanatory diagram for explaining an example of a conflict between communications via different wireless links, which may occur in the relay UE.

FIG. 15 is an explanatory diagram for explaining an example of a conflict between communications via different wireless links, which may occur in the remote UE.

FIG. 16 is an explanatory diagram for explaining another example of the conflict between communications via different wireless links, which may occur in the relay UE.

FIG. 17 is an explanatory diagram for explaining another example of the conflict between communications via different wireless links, which may occur in the remote UE.

FIG. 18 is an explanatory diagram for explaining another example of the conflict between communications via different wireless links, which may occur in the relay UE.

FIG. 19 is an explanatory diagram for explaining another example of the conflict between communications via different wireless links, which may occur in the remote UE.

FIG. 20 is a flow chart illustrating an example of a flow of a series of processing of the system according to the embodiment.

FIG. 21 is a block diagram illustrating a first example of a schematic configuration of an eNB.

FIG. 22 is a block diagram illustrating a second example of the schematic configuration of the eNB.

FIG. 23 is a block diagram illustrating an example of a schematic configuration of a smartphone.

FIG. 24 is a block diagram illustrating an example of a schematic configuration of a car navigation apparatus.

MODES FOR CARRYING OUT THE INVENTION

Description is given below in detail of preferred embodiments of the present disclosure with reference to attached drawings. It is to be noted that, in the present specification and drawings, repeated description is omitted for components substantially having the same functional configuration by assigning the same reference numerals. It is to be noted that the description is given in the following order.

1. Overview
1.1. Overall Configuration
1.2. Request for Relay Communication
1.3. Use Case
1.4. Coverage Scenario
1.5 Relay Type
1.6. Assumed Traffic
1.7. Resource Allocation
1.8. Difference from Communication by Relay Base Station
1.9. Example of Deployment
1.10. Configuration Example of Each Apparatus
1.10.1. Configuration Example of Base Station Apparatus
1.10.2. Configuration Example of Relay UE
1.10.3. Configuration Example of Remote UE
2. Consideration regarding FeD2D
3. Technical Feature
3.1 Example of Control Assuming Conflict between Pieces of Transmission Processing
3.2 Example of Control Assuming Conflict Between Pieces of Reception Processing
3.3 Example of Control Assuming Conflict between Transmission Processing and Reception Processing
4. Application Examples
4.1. Application Example of Base Station
4.2. Application Example of Terminal Apparatus
5. Closing

1. Overview

1.1. Overall Configuration

FIG. 1 is an explanatory diagram of an example of a configuration of a system 1 according to an embodiment of the present disclosure. As illustrated in FIG. 1, the system 1 according to the present embodiment includes a base station apparatus 100, a terminal apparatus 200, and terminal apparatuses 300 (e.g., terminal apparatuses 300A and 300B).

The base station apparatus 100 operates a cell and provides wireless services to one or more terminal apparatuses positioned inside the cell. For example, the base station apparatus 100 provides the wireless service to each of the terminal apparatuses 200 and 300. The cell may be operated in accordance with, for example, any wireless communication method such as 4G, 5G, LTE or NR (New Radio).

The terminal apparatus 200 and the terminal apparatus 300 perform a wireless communication with the base station apparatus 100 under control of the base station apparatus 100. The terminal apparatus 200 and the terminal apparatus 300 may be a so-called user terminal (UE: User Equipment). The terminal apparatus 200 and the terminal apparatus 300 form a link (e.g., downlink or uplink) with the base station apparatus 100. Then, the terminal apparatus 200 and the terminal apparatus 300 transmit an uplink signal to the base station apparatus 100 and receive a downlink signal from the base station apparatus 100. In this manner, a communication with the base station apparatus 100 without using another apparatus therebetween is also referred to as "direct communication".

Here, the terminal apparatus 200 is a relay communication apparatus configured to be movable which has a function of relaying (i.e., relaying) communication to or from another apparatus. For example, the terminal apparatus 200 is able to relay a communication between the base station apparatus 100 and the terminal apparatus 300. In other words, the base station apparatus 100 is able to communicate with the terminal apparatus 300 through a relay of communication performed by the terminal apparatus 200. Specifically, the terminal apparatus 200 receives, from the terminal apparatus 300, an uplink signal to the base station apparatus 100 and transfers the received signal to the base station apparatus 100, and receives, from the base station apparatus 100, a downlink signal to the terminal apparatus 300 and transfers the received signal to the terminal apparatus 300. A communication with the base station apparatus 100 via another apparatus in this manner is also referred to as "relay communication". Typically, use of the relay communication enables the terminal apparatus 300 to communicate at lower power consumption than use of the direct communication. The link formed between the terminal apparatus 200 and the terminal apparatus 300 is also referred to as a side link (Sidelink). In addition, the link formed between the base station apparatus 100 and the terminal apparatus 200 is also referred to as a backhaul link (Backhaul link); a wireless link is assumed here. It is to be noted that, FIG. 1 illustrates an example where one terminal apparatus 200 relays the relay communication; however, two or more terminal apparatuses 200 may relay the relay communication.

Hereinafter, the terminal apparatus 200 configured to be movable having a relay function is also referred to as a relay communication apparatus, a relay terminal, or a relay UE (Relay UE), and the terminal apparatus 300 that communicates via a relay UE 200 is also referred to as a remote communication apparatus, a remote terminal, or a remote UE. The remote UE 300 is, for example, an IoT device that performs low-frequency communication. Alternatively, the remote UE 300 may be a smartphone, an in-vehicle terminal, a drone, or the like. The relay UE 200 may likewise be achieved, for example, as an apparatus dedicated to the relay, an IoT-device, a smartphone, an in-vehicle terminal, a drone, or the like.

A relay base station is an apparatus similar to the relay UE. The relay base station has been standardized by 3GPP. Hereinafter, a difference between the relay base station and the relay UE is described.

1.2. Request for Relay Communication

Typical examples of an IoT terminal using the relay communication (in other words, a low-cost terminal) include a wearable terminal. In the wearable terminal, low power consumption, highly reliable communication, and sometimes large-capacity communication are required. In order to cover such use cases, standardization of FeD2D (Further enhancement D2D) has been started in the 3GPP in 2016. The wearable terminal is typically positioned around a user himself or herself; therefore, applying relay communication utilizing a user terminal such as smartphone as a relay communication apparatus (relay UE) makes it possible to shorten a communication distance of the wearable terminal itself and thus to achieve highly reliable communication with low power consumption.

In relay communication for so-called remote communication apparatuses (remote UEs) such as wearable terminals, guaranteeing end to end (End to end) communication quality (QoS) between the base station and the remote communication apparatus is critical, and it is desired to establish a highly-reliable communication path. Further, for example, a wearable terminal, etc. is assumed as the remote communication apparatus, and thus low-complexity (Low complexity), low-cost (Low cost), and low-power-consumption (Low power consumption) communication is required. In order to achieve these requirements, it is requested that the following requirement items be achieved.

The first requirement item is improved side link (Sidelink) communication. In the side link, closed loop feedback (Closed loop feedback) communication for performing retransmission or the like is not performed. However, in order to satisfy the first requirement item, it is desirable that functions such as feedback-based link adaptation and HARQ (Hybrid automatic repeat request) be supported, for example, in order to achieve the QoS and the highly-reliable communication.

The second requirement item is lower power consumption. In order to satisfy the second requirement item, for example, it is desirable to support functions such as transmission power control and DRX (Discontinuous Reception).

The third requirement item is service continuity (Service continuity). For remote communication apparatuses such as wearable terminals, the link quality changes dynamically. Accordingly, in order to satisfy the third requirement item, it is desirable to support functions such as optimization of handover and path switching.

1.3. Use Case

In relay communication utilizing a wearable terminal as a remote communication apparatus, various use cases are assumed. For example, FIGS. 2 and 3 each illustrate an example of a communication environment assumed in the relay communication utilizing a wearable terminal as the remote communication apparatus.

Specifically, two communication environments are assumed: a short-range communication (Short range communication) environment as illustrated in FIG. 2 and a wide-range communication (Wide range communication) environment as illustrated in FIG. 3. Generally, the term wearable may cause an assumption of a case where a user holds a terminal apparatus (Short range communication), but is not necessarily limited to a wearable circumstance technically. That is, even in an environment where the user does not hold some of terminal apparatuses, it is possible to achieve the relay communication itself. As a specific example, as in the example illustrated in FIG. 3, a mobile object such as a vehicle may operate as the remote UE 300, and a terminal apparatus such as a smartphone held by a user may operate as the relay UE 200. Accordingly, it is desired that the relay communication be supported not only in the short-range communication (Short range communication) as illustrated in FIG. 2, but also in the wide-range communication (Wide range communication) as illustrated in FIG. 3. In addition, satellite communication or the like may be used as the backhaul link. In this case, the relay UE 200 is achieved by relay stations and repeaters of satellite communication.

FIG. 4 illustrates an example of a use case of MTC, and illustrates an example of a case where an MTC terminal such as a smart meter installed in a house is applied as a remote communication apparatus. That is, as illustrated in FIG. 4, it is also possible for the smart meter to transmit data via the relay communication apparatus instead of directly transmitting the data to the base station. It is to be noted that, also in this case, the relay communication apparatus may be fixed or may have mobility. In this manner, the relay communication via the relay communication apparatus makes it possible to achieve lower power consumption in the remote communication apparatus.

1.4. Coverage Scenario

Next, description is given of a coverage scenario of the FeD2D. For example, FIG. 5 illustrates an example of a coverage scenario that may be assumed in the FeD2D. As illustrated in FIG. 5, four patterns of scenarios may be assumed depending on whether or not the remote communication apparatus is within a range of the base station and whether a connection is established between the relay communication apparatus and the remote communication apparatus.

As the main use cases that may be assumed in the FeD2D, In-coverage scenarios as Scenarios 3 and 4 are conceivable as illustrated in FIG. 5. That is, in an environment where a connection to the base station is established, it is possible for the remote communication apparatus to be coupled to the relay communication apparatus to reduce power consumption in uplink transmission.

Further, out-of-coverage (Out-of-coverage) scenarios may also be assumed in which the remote communication apparatus is positioned outside a range of the base station, as illustrated as Scenarios 1 and 2 in FIG. 5. In the use case assuming a wearable terminal, a distance between the base station and the relay communication apparatus and a distance between the base station and the remote communication apparatus are basically the same. However, due to differences in the antenna configuration and the like, a case may also be assumed where the remote communication apparatus is out of coverage despite the remote communication apparatus and the relay communication apparatus being in the same position. Accordingly, it is desirable to also support a case where the remote communication apparatus is out of coverage.

1.5. Relay Type

Next, description is given of relay types in the FeD2D. FIGS. 6 and 7 are explanatory diagrams for explaining the relay types in the FeD2D. It is possible for the relay type in the FeD2D to be classified into a case of bidirectional relay (Bidirectional relay) illustrated in FIG. 6 and a case of unidirectional relay (Unidirectional relay) illustrated in FIG. 7, depending on whether or not the remote communication apparatus has a reception capability (Reception capability) in the side link (Sidelink).

As illustrated in FIG. 6, in the case of the bidirectional relay, it is possible to transmit a DL signal (downlink signal) from the base station apparatus 100 to the remote UE 300 via the relay UE 200. In this case, the remote UE 300 needs to receive side link signals, and thus it is necessary to separately provide a receiver of SC-FDMA which is a waveform (Waveform) of the side link.

Specifically, OFDMA is applied as a communication method to transmission of the DL signal (downlink signal) from the base station apparatus 100 to the relay UE 200 and to transmission of the DL signal from the base station apparatus 100 to the remote UE 300 via a Uu link. Meanwhile, in a communication between the relay UE 200 and the remote UE 300 via a side link, SC-FDMA is applied as a communication method. Thus, in the case of the bidirectional relay, the remote UE 300 requires an OFDMA receiver and an SC-FDMA receiver. It is to be noted that the SC-FDMA is applied as a communication method to transmission of a UL signal (uplink signal) from the relay UE 200 to the base station apparatus 100 and transmission of the UL signal from the remote UE 300 to the base station apparatus 100 via the Uu link.

Meanwhile, as illustrated in FIG. 7, in the case of the unidirectional relay, the DL signal is directly transmitted from the base station apparatus 100 to the remote UE 300 via the Uu link, and only the UL signal (uplink signal) is transmitted from the remote UE 300 to the base station apparatus 100 via the relay UE 200. That is, in the case of the unidirectional relay, the SC-FDMA receiver becomes unnecessary for the remote UE 300, thus allowing for cost reduction, in contrast to the case of the bidirectional relay.

As described above, in a case where the FeD2D is applied, it is desirable to support these relay types.

1.6. Assumed Traffic

Another characteristic point in an operation environment is traffic. Examples of a terminal assumed as the remote communication apparatus include a terminal that requires high data rate to a terminal that performs communication of a quite small amount of data packets such as car key unlocking. In view of such circumstances, it is desirable to support a wide variation of traffic volumes.

1.7. Resource Allocation

Description is given of allocation of resources to respective wireless links in the FeD2D communication, focusing particularly on a method of allocating resources to side links. In the FeD2D communication, as a resource allocation method for the side links, three methods may be mainly assumed: allocation of resources by the base station apparatus 100, allocation of resources by the relay UE 200, and allocation of resources by the remote UE 300. It is to be noted that, when the relay UE 200 allocates resources to the side link, there may be a case where allocation may be carried out under the control of the base station apparatus 100.

1.8. Difference from Communication by Relay Base Station

Next, description is given of a main difference between relay communication utilizing a relay base station that has already been standardized in the 3GPP and relay communication utilizing a relay terminal apparatus that is assumed by the present disclosure.

Specifically, there is a difference in that the relay base station is fixedly installed, whereas the relay communication apparatus has a mobility function (i.e., is configured to be movable).

Owners of the relay base station and the relay communication apparatus are different. Specifically, the relay base station is owned by a manager (an operator), and operates with the same authority as the base station. Meanwhile, the relay communication apparatus is property of the user, and the function as the infrastructure is more limited than that of the relay base station. Further, in general, it is assumed that the relay communication apparatus operates under the control of the base station.

The relay base station mainly assumes, as a communication target, a communication terminal such as a smartphone. Meanwhile, there is a case where the relay communication apparatus may be required to support various types of communication traffic that assumes, as a communication target, not only a communication terminal such as a smartphone, but also, for example, a NB-IoT terminal, etc. such as the MTC terminal.

Terminal deployment (Deployment) at the relay base station is uniformly distributed within the coverage. Meanwhile, in the relay communication via the relay communication apparatus assuming usage of a wearable terminal, classification is performed into deployment in the case of the short-range communication such as a case where a wearable device is worn by a user and deployment in other cases. That is, the relay communication utilizing the relay communication apparatus is characterized by deployment of the remote communication apparatus, and is greatly different from the deployment in the relay communication utilizing the relay base station.

1.9. Example of Deployment

Next, description is given below of an example of deployment in the relay communication utilizing the relay communication apparatus.

Specific examples thereof include deployment assuming relay communication in which a wearable terminal is applied as a remote communication apparatus, as in the use case described with reference to FIG. 2. In this case, for example, a communication terminal such as a smartphone operates as the relay UE 200. In addition, a wearable terminal such as a smartwatch operates as the remote UE 300.

In addition, another example thereof include deployment assuming relay communication in which the MTC terminal such as a smart meter is applied as a remote communication apparatus, as in the use case described with reference to FIG. 4. In this case, for example, an infrastructural apparatus installed at a street lamp, etc. operates as the relay UE 200. Further, the MTC terminal or the IoT terminal, such as a smart meter or a various sensor operates as the remote UE 300.

In addition, another example thereof include deployment assuming relay communication in which, in home access point (Home access point) communication utilizing an apparatus such as a router in a home network, the apparatus is applied as the relay UE 200. For example, FIG. 8 is an explanatory diagram for explaining an example of deployment in a case where the FeD2D is applied to the home access point communication. Specifically, FIG. 8 illustrates an example of a case where a wearable terminal, a PC, or the like in a home network operating as the remote UE 300 performs relay communication with the base station apparatus 100 via the apparatus such as the router operating as the relay UE 200.

Further, as another example, relay communication may be achieved by utilizing a mobile object such as a vehicle or a drone as the relay UE 200. For example, FIG. 9 is an explanatory diagram for explaining an example of deployment in a case where the FeD2D is achieved by utilizing a mobile object as a relay UE. Specifically, FIG. 9 illustrates an example of a case where a wearable terminal, etc. held by a user operates as the remote UE 300 and performs relay communication with the base station apparatus 100 via a mobile object operating as the relay UE 200. It is to be noted that, as the example illustrated in FIG. 9, there may be assumed both use cases: a case where the user holding the remote UE 300 is a driver of a mobile object (vehicle) operating as the relay UE 200 and a case where the user holding the remote UE 300 differs from the driver of the mobile object.

1.10. Configuration Example of Each Apparatus

Next, description is given of configuration examples of respective apparatuses in the system according to an embodiment of the present disclosure.

1.10.1. Configuration Example of Base Station Apparatus

First, description is given of an example of a configuration of the base station apparatus 100 with reference to FIG. 10. FIG. 10 is a block diagram illustrating an example of a configuration of the base station apparatus 100 according to the present embodiment. As illustrated in FIG. 10, the base station apparatus 100 includes an antenna unit 110, a wireless communication unit 120, a network communication unit 130, a storage unit 140, and a control unit 150.

(1) Antenna Unit 110

The antenna unit 110 radiates a signal outputted by the wireless communication unit 120 into space as a radio wave. In addition, the antenna unit 110 converts a radio wave in the space to a signal, and outputs the signal to the wireless communication unit 120.

(2) Wireless Communication Unit 120

The wireless communication unit 120 transmits and receives signals. For example, the wireless communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes and receives information from other nodes. For example, the above-described other nodes include other base stations and core network nodes.

(4) Storage Unit 140

The storage unit 140 temporarily or permanently stores programs for operation of the base station apparatus 100 and various types of data.

(5) Control Unit 150

The control unit 150 provides various functions of the base station apparatus 100. The control unit 150 includes a setting section 151 and a communication control section 153. The setting section 151 sets resources for the relay UE 200 and the remote UE 300. The resource as used herein is a resource for communication in the side link, the Uu link, or the backhaul link. The communication control section 153 performs communication processing with the relay UE 200 or the remote UE 300 in the set resources. For example, the communication control section 153 transmits and receives a data signal, a control signal, a reference signal, and a discovery signal to and from the relay UE 200 or the remote UE 300. It is to be noted that the control unit 150 may further include other components in addition to these components. That is, the control unit 150 may perform operations other than those of these components.

1.10.2. Configuration Example of Relay UE

Next, description is given of an example of a configuration of the relay UE 200 with reference to FIG. 11. FIG. 11 is a block diagram illustrating an example of a configuration of the relay UE 200 according to the present embodiment. As illustrated in FIG. 11, the relay UE 200 includes an antenna unit 210, a wireless communication unit 220, a storage unit 230, and a control unit 240.

(1) Antenna Unit 210

The antenna unit 210 radiates a signal outputted by the wireless communication unit 220 into space as a radio wave. In addition, the antenna unit 210 converts a radio wave in the space to a signal, and outputs the signal to the wireless communication unit 220.

(2) Wireless Communication Unit 220

The wireless communication unit 220 transmits and receives signals. For example, the wireless communication unit 220 receives a downlink signal from a base station and transmits an uplink signal to the base station.

In the present embodiment, the wireless communication unit 220 transmits, to the base station apparatus 100 or the relay UE 200, an uplink signal to the base station apparatus 100, and receives, from the base station apparatus 100 or the relay UE 200, a downlink signal from the base station apparatus 100.

In the present embodiment, the wireless communication unit 220 may receive an uplink signal from the remote UE 300 to the base station apparatus 100 and transfer the received uplink signal to the base station apparatus 100, and may receive a downlink signal from the base station apparatus 100 to the remote UE 300 and transfer the received downlink signal to the remote UE 300.

(3) Storage Unit 230

The storage unit 230 temporarily or permanently stores programs for operation of the relay UE 200 and various types of data.

(4) Control Unit 240

The control unit 240 provides various functions of the relay UE 200. The control unit 240 includes a setting section 241, a determination section 243, and a communication control section 245. The setting section 241 sets resources for the remote UE 300. The resource as used herein is a resource for communication in the side link. The determination section 243 executes various types of determination processing related to transmission and reception of data with the base station apparatus 100 via a link or with the remote UE 300 via a link. For example, the determination section 243 determines, in accordance with various conditions, whether or not to multiplex communication with the base station apparatus 100 via a wireless link (e.g., transmission or reception of data) and communication with the remote UE 300 via the wireless link. In addition, the determination section 243 determines, in accordance with various conditions, which of packet to be transmitted to the base station apparatus 100 via the wireless link and a packet to be transmitted to the remote UE 300 via the wireless link is dropped. Under the control of the base station apparatus 100, the communication control section 245 communicates with the base station apparatus 100 and relays the communication between the base station apparatus 100 and the remote UE 300. In addition, for example, the communication control section 245 transmits and receives a data signal, a control signal, a reference signal, and a discovery signal to and from the base station apparatus 100 or the remote UE 300. It is to be noted that the control unit 240 may further include other components in addition to these components. That is, the control unit 240 may perform operations other than those of these components.

1.10.3. Configuration Example of Remote UE

Next, description is given of an example of a configuration of the remote UE 300 with reference to FIG. 12. FIG. 12 is a block diagram illustrating an example of a configuration of the remote UE 300 according to the present embodiment. Referring to FIG. 12, the remote UE 300 includes an antenna unit 310, a wireless communication unit 320, a storage unit 330, and a control unit 340.

(1) Antenna Unit 310

The antenna unit 310 radiates a signal outputted by the wireless communication unit 320 into the space as a radio wave. In addition, the antenna unit 310 converts a radio wave in the space to a signal, and outputs the signal to the wireless communication unit 320.

(2) Wireless Communication Unit 320

The wireless communication unit 320 transmits and receives signals. For example, the wireless communication unit 320 receives a downlink signal from a base station and transmits an uplink signal to the base station.

In the present embodiment, the wireless communication unit 320 transmits, to the base station apparatus 100 or the relay UE 200, an uplink signal to the base station apparatus 100, and receives, from the base station apparatus 100 or the relay UE 200, a downlink signal from the base station apparatus 100.

(3) Storage Unit 330

The storage unit 330 temporarily or permanently stores programs for operation of the remote UE 300 and various types of data.

(4) Control Unit 340

The control unit 340 provides various functions of the remote UE 300. The control unit 340 includes a determination section 341 and a communication control section 343. The determination section 341 executes various types of determination processing related to transmission and reception of data with the base station apparatus 100 via a link or with the relay UE 200 via a link. For example, the determination section 341 determines, in accordance with various conditions, whether or not to multiplex communication with the base station apparatus 100 via a wireless link (e.g., transmission or reception of data) and communication with the relay UE 200 via a wireless link. In addition, the determination section 341 determines, in accordance with various conditions, which of a packet to be transmitted to the base station apparatus 100 via a wireless link or a packet to be transmitted to the relay UE 200 via a wireless link is dropped. The communication control section 343 performs communication processing with the base station apparatus 100 or the relay UE 200 on the basis of a measurement result. In addition, for example, the communication control section 343 transmits and receives a data signal, a control signal, a reference signal, and a discovery signal to and from the base station apparatus 100 or the relay UE 200. It is to be noted that the control unit 340 may further include other components in addition to these components. That is, the control unit 340 may perform operations other than those of these components.

2. Consideration Regarding FeD2D

Next, description is given below of an overview of technical problems of a system according to the present embodiment in achieving the FeD2D.

In the FeD2D, the remote UE 300 and the relay UE 200 perform transmission and reception for each of the direct link to and from the base station apparatus 100 and the side link. Specifically, as illustrated in FIG. 6, the remote UE 300 communicates with the base station apparatus 100 via the Uu link and communicates with the relay UE 200 via the side link. Further, the relay UE 200 communicates with the base station apparatus 100 via the backhaul link and communicates with the remote UE 300 via the side link.

On the other hand, in a terminal apparatus applied as the remote UE 300 or the relay UE 200, there is a case where a transmission device (Tx) or a reception device (Rx) available for a communication with the apparatuses via the wireless links may be limited. From such a circumstance, a case may be assumed where a conflict (conflict) in a transmission device or a reception device occurs between communications via mutually different wireless links. It is to be noted that, in the present disclosure, the "conflict" indicates, for example, a circumstance where processing for the communications via mutually different wireless links attempts to use a common transmission device or reception device at substantially the same timing unintentionally. From such a circumstance, a mechanism for avoiding the above-mentioned conflict has been required. It is to be noted that, in the following description, it is assumed that mere description "a conflict (conflict)" indicates a conflict in the transmission device or the reception device between the communications via mutually different wireless links, unless otherwise described.

For example, FIG. 13 is an explanatory diagram for explaining an example of a configuration of the transmission device and the reception device in each of the relay UE 200 and the remote UE 300, with a correspondence relationship between the transmission device as well as the reception device and respective wireless links. It is to be noted that, in this description, for the sake of convenience, description is given, assuming that the same bandwidth as that of uplink communication from each of the relay UE 200 and the remote UE 300 to the base station apparatus 100 is used for communication via the side link. However, the bandwidth of the communication via the side link is not necessarily limited to the above example. As a specific example, a bandwidth similar to that of downlink communication from the base station apparatus 100 to each of the relay UE 200 and the remote UE 300 may be used for the communication via the side link.

First, description is given, focusing on the configuration of the relay UE 200. As the relay UE 200, for example, a 1Tx2Rx configuration and a 1Tx4Rx configuration may be typically assumed.

The 1Tx2Rx configuration is a configuration that includes one transmission device and two reception devices. In addition, the 1Tx4Rx configuration is a configuration that includes one transmission device and four reception devices. It is to be noted that, in the relay UE 200, for example, two reception devices may operate in pairs, and processing related to maximal ratio combining, MIMO (Multiple-Input and Multiple-Output), and the like may be performed on the basis of a result of reception of a radio signal performed by each of the reception devices. That is, the 1Tx2Rx configuration includes one pair of two reception devices, and the 1Tx4Rx configuration includes two pairs of two reception devices. It is to be noted that the configurations of the transmission device and the reception device in the relay UE 200 illustrated in FIG. 13 are merely examples, and the configuration of the relay UE 200 is not necessarily limited. As a specific example, each reception device may operate alone independently.

Further, the communication between the relay UE 200 and the remote UE 300 via the side link uses a portion of the frequency band used in the communication between each of the relay UE 200 and the remote UE 300 and the base station apparatus 100 via the uplink, as described above. In a case of FDD, the communication between the relay UE 200 and the base station apparatus 100 via the backhaul link performs an operation by utilizing a frequency band different from those of the downlink and the uplink (and the side link). Meanwhile, in a case of TDD, an operation is performed in a time-division manner by utilizing the same frequency band as those of the downlink and the uplink (and the side link). It is to be noted that, in the following description, description is given, focusing on the case of the FDD.

A terminal apparatus with limited functions such as a wearable terminal or an MTC terminal may be assumed to be applied to the remote UE 300. Accordingly, the configurations of the transmission device and the reception device in the remote UE 300 are typically assumed to be a 1Tx1Rx configuration. The 1Tx1Rx configuration is a configuration that includes one transmission device and one reception device. It is needless to say that this configuration is merely an example, and the configuration of the remote UE 300 is not necessarily limited.

The configuration of the remote UE 300 is classified into Type1 and Type2. In a case of Type1, the remote UE 300 has a communication capability for both of an uplink and a downlink in the side link. In contrast, in a case of Type2, the remote UE 300 has a communication capability for only one of the uplink and the downlink in the side link. As a specific example, in the example illustrated in FIG. 13, the remote UE 300 has a communication capability of a side link downlink (SL DL). Meanwhile, in the case of Type2, the remote UE 300 has no communication capability of the side link downlink. That is, in the case of Type2, for example, the case of the unidirectional relay described above is applied.

Next, description is given of the example of FIG. 13 by way of an example of a case where there is a possibility that a conflict (conflict) in the transmission device or the reception device may occur between the communications via the mutually different wireless links.

First, description is given of an example of the conflict between transmissions via mutually different wireless links, in the relay UE 200 and the remote UE 300.

For example, FIG. 14 is an explanatory diagram for explaining an example of a conflict (conflict) between communications via different wireless links, which may occur in the relay UE 200. As illustrated in FIG. 14, in the relay UE 200, there is a possibility that UL transmission via the backhaul link and UL transmission via the side link may be executed simultaneously. It is to be noted that the same frequency band is used for these two pieces of transmission processing. In such a case, there is a possibility that a conflict may occur between these two pieces of transmission processing. It is to be noted that, under such a circumstance where the conflict occurs, for example, a control is required such that switching is performed between these two pieces of transmission processing along the time axis (i.e., time division is performed) or that frequency multiplexing (i.e., frequency division) of these two transmissions is performed at the same time.

Further, FIG. 15 is an explanatory diagram for explaining an example of a conflict (conflict) between communications via different wireless links, which may occur in the remote UE 300. As illustrated in FIG. 15, in the remote UE 300, there is a possibility that the UL transmission via the Uu link and the UL transmission via the side link may be executed simultaneously. It is to be noted that the same frequency band is used for these two pieces of transmission processing. In such a case, there is a possibility that a conflict may occur between these two pieces of transmission processing. It is to be noted that, under such a circumstance where the conflict occurs, for example, a control is required such that switching is performed between these two pieces of transmission processing along the time axis (i.e., time division is performed) or that these two transmissions are multiplexed.

Next, description is given of an example of a conflict between receptions via mutually different wireless links, in the relay UE 200 and the remote UE 300.

For example, FIG. 16 is an explanatory diagram for explaining another example of a conflict (conflict) between communications via different wireless links, which may occur in the relay UE 200. As illustrated in FIG. 16, in the relay UE 200, there is a possibility that DL transmission via the backhaul link and the DL transmission via the side link may be executed simultaneously. It is to be noted that mutually different frequency bands are used for these two pieces of reception processing. In such a case, there is a possibility that a conflict may occur between these two pieces of reception processing. It is to be noted that, under such a circumstance where the conflict occurs, for example, a control is required such that switching is performed between these two pieces of reception processing along the time axis (i.e., time division is performed).

Further, FIG. 17 is an explanatory diagram for explaining another example of a conflict (conflict) between communications via different wireless links, which may occur in the remote UE 300. As illustrated in FIG. 17, in the remote UE 300, there is a possibility that DL transmission via the Uu link and the DL transmission via the side link may be executed simultaneously. It is to be noted that mutually different frequency bands are used for these two pieces of reception processing. The remote UE 300 is assumed to be a low-cost terminal, and thus a configuration of 1Tx and 1 Rx is typical for blocks of transmission and reception. In such a case, there is a possibility that a conflict may occur between these two pieces of reception processing. It is to be noted that, under such a circumstance where the conflict occurs, for example, a control is required such that switching is performed between these two pieces of reception processing along the time axis (i.e., time division is performed).

Next, description is given of an example of a conflict between transmission and reception via mutually different wireless links, in the relay UE 200 and the remote UE 300.

For example, FIG. 18 is an explanatory diagram for explaining another example of a conflict (conflict) between communications via different wireless links, which may occur in the relay UE 200. As illustrated in FIG. 18, in the relay UE 200, there is a possibility that the UL transmission via the backhaul link and DL reception via the side link may be executed simultaneously. It is to be noted that the same frequency band is used for the transmission processing and the reception processing. In such a case, there is a possibility that a conflict may occur between the transmission processing and the reception processing. It is to be noted that, in such a circumstance where the conflict occurs, for example, a control is required such that switching is performed between the transmission processing and the reception processing along the time axis (i.e., time division is performed). Alternatively, as another example, Full duplex communication may be applied to the transmission processing and the reception processing.

Further, FIG. 19 is an explanatory diagram for explaining another example of a conflict (conflict) between communications via different wireless links, which may occur in the remote UE 300. As illustrated in FIG. 19, in the remote UE 300, there is a possibility that the UL transmission via the Uu link and the DL reception via the side link may be executed simultaneously. It is to be noted that the same frequency band is used for the transmission processing and the reception processing. In such a case, there is a possibility that a conflict may occur between the transmission processing and the reception processing. It is to be noted that, in such a circumstance where the conflict occurs, for example, a control is required such that switching is performed between the transmission processing and the reception processing along the time axis (i.e., time division is performed). Alternatively, as another example, Full duplex communication may be applied to the transmission processing and the reception processing.

In view of the above circumstances, the present disclosure proposes a technique that makes it possible to achieve higher-quality FeD2D communication.

3. Technical Feature

Next, description is given of technical features of the system according to an embodiment of the present disclosure.

3.1. Example of Control Assuming Conflict Between Pieces of Transmission Processing First, description is given of an example of a control that assumes a conflict (conflict) between pieces of transmission processing via mutually different wireless links, in the relay UE 200 and the remote UE 300. For example, FIG. 20 is a flow chart illustrating an example of a flow of a series of processing of the system according to the present embodiment, and illustrates an example of processing, focusing on a mechanism for further reducing an influence of the conflict in the transmission device or the reception device between communications via the mutually different wireless links.

As illustrated in FIG. 20, first, determination is made as to whether or not coordination (Coordination) by a scheduler is possible, and the subsequent processing is switched depending on the result of the determination (S101). It is to be noted that, in the present explanation, the scheduler is assumed to be a scheduler in the base station apparatus 100, or a scheduler in each of the relay UE 200 and the remote UE 300. In addition, an agent of the determination is not particularly limited. As a specific example, either the base station apparatus 100 or the relay UE 200 may make the above determination. Further, for the above determination, information exchange may be performed among the base station apparatus 100, the relay UE 200, and the remote UE 300, in order to determine whether or not the coordination is possible. In addition, reconfiguration (Reconfiguration) may be performed as to whether or not to carry out handling by the scheduler as a system. In addition, decision may be made as to whether or not to carry out the handling by the scheduler in accordance with an instruction from a higher layer (Higher layer).

In a case where determination is made that the coordination by the scheduler is possible (S101, YES), the base station apparatus 100 and the relay UE 200 share various types of information (S103).

(Provision of Information from Base Station Apparatus 100 to Relay UE 200) As a specific example, the base station apparatus 100 may provide the relay UE 200 or the remote UE 300 with information regarding allocation of resources to the UL in the communication via the Uu link.

The relay UE 200 controls allocation of resources to the SL on the basis of the information provided from the base station apparatus 100 such that no conflict (Conflict) occurs between the UL transmission via the Uu link or the backhaul link and SL transmission. More specifically, the relay UE 200 controls allocation of resources to be used for DL transmission by the relay UE 200 itself to the remote UE 300 via the side link, in a case where the relay UE 200 itself performs transmission. Further, in a case where the remote UE 300 performs transmission, the relay UE 200 controls such that no conflict occurs between the UL transmission by the remote UE 300 via the Uu link and the UL transmission by the remote UE 300 via the side link.

Further, the relay UE 200 may control allocation of resources to the side links such that no conflict (Conflict) occurs between the UL transmission via the backhaul link and the SL transmission.

The information provided by the base station apparatus 100 may include, for example, uplink grant (UL grant) information at a UL transmission terminal (relay UE 200 or remote UE 300) that performs UL transmission to the base station apparatus 100. Further, the information may include UL grant information (also referred to as "UL grant reservation information") to which application is reserved thereafter.

Further, the information provided by the base station apparatus 100 may include, for example, information on a region of a resource pool utilized for the UL transmission to the base station apparatus 100. In this case, a resource for the UL transmission is decided in advance by the base station apparatus 100, and the UL transmission is carried out only in the resource. It is to be noted that the resource pool may be a resource allocated in a quasi-static (Semi-Persistent) manner for SPS (Semi-Persistent Scheduling) transmission.

Further, the information provided by the base station apparatus 100 may include information regarding a resource for transmission of a response (ACK/NACK) for the DL transmission. In this case, information regarding the resource itself for the transmission of ACK/NACK may be notified, and information regarding the resource pool for the transmission of ACK/NACK may be notified. Further, information regarding the DL transmission may be notified. In this case, a transmission timing of ACK/NACK may be derived on side of the terminal apparatus (i.e., the relay UE 200 or the remote UE 300). Such control allows for calculation of the timing of the UL transmission on the side of the terminal apparatus on the basis of the information regarding the resource for the transmission of the ACK/NACK for the DL transmission, thereby making it possible to suppress occurrence of a conflict (Conflict) and thus to achieve a communication via the side links in a more suitable mode.

In addition, the base station apparatus 100 may also provide the relay UE 200 with information regarding changing the allocation of a resource pool to the side link.

At this time, the base station apparatus 100 may change the resource allocation of the side link in accordance with a status of the UL transmission from the remote UE 300 via the Uu link. Such a control makes it possible to prevent the occurrence of a conflict between the communication via the Uu link and the communication via the side link.

In addition, the base station apparatus 100 may change the allocation of the resource pool of the side link, in accordance with BSR (Buffer status report) information notified from the relay UE 200 or the remote UE 300. Examples of the BSR information include BSR information regarding a communication via the Uu link and BSR information regarding a communication via the side link.

In such a case, the information notified from the base station apparatus 100 may include, for example, information regarding allocation of a resource pool to the side link.

In addition, the information notified from the base station apparatus 100 may include configuration (configuration) information of the UL/DL via the side link. In this case, for example, the relay UE 200 is notified of the configuration information of the UL/DL via the side link set in the base station apparatus 100. At this time, an identifier (e.g., Configuration ID) corresponding to the configuration information may be notified. Further, at this time, UL/DL bitmap (Bitmap) information (e.g., Bitmap ID, etc.) at a subframe (Subframe) level may be notified.

In addition, the information notified from the base station apparatus 100 may include SPS allocation information to the relay UE 200 or the remote UE 300 in a communication via the side link. In this case, for example, an offset (Offset) value, a duration (Duration) value, a period (Period) value, or the like of the SPS may be notified as the SPS allocation information. Further, at this time, the SPS allocation information to a plurality of remote UEs 300 may be collectively notified to the relay UE 200. It is to be noted that examples of the method of notifying these pieces of information include a method utilizing system information (SIB: System Information Block), an RRC message, DCI (Downlink Control Information), or the like.

In addition, in a case where coordination of the UL transmission or the DL transmission via the side link is difficult, the relay UE 200 may request the base station apparatus 100 to change the allocation of a resource to a communication via the Uu link. In this case, the base station apparatus 100 may change the configuration (Configuration) of the UL/DL resource in the communication via the Uu link, upon reception of the request from the relay UE 200.

(Provision of Information from Relay UE 200 to Base Station Apparatus 100) Further, as another example, the relay UE 200 may provide the base station apparatus 100 with information regarding allocation of a resource to a communication via the side link.

On the basis of the information provided from the relay UE 200, the base station apparatus 100 controls the allocation of a resource to the Uu link (in particular, the allocation of a resource for the UL transmission) such that no conflict (Conflict) occurs between the Uu UL transmission and the SL transmission.

The information provided from the relay UE 200 may include, for example, configuration (configuration) information of the UL/DL via the side link. In this case, for example, the relay UE 200 is notified of the configuration information of the UL/DL via the side link set in the relay UE 200. At this time, an identifier (e.g., Configuration ID) corresponding to the configuration information may be notified. Further, at this time, UL/DL bitmap (Bitmap) information (e.g., Bitmap ID, etc.) at a subframe (Subframe) level may be notified.

In addition, the information notified from the relay UE 200 may include, for example, information regarding allocation of a resource pool to the side link. Further, the information notified from the relay UE 200 may include SPS allocation information to the remote UE 300 in a communication via the side link. In this case, for example, an offset (Offset) value, a duration (Duration) value, a period (Period) value, or the like of the SPS may be notified as the SPS allocation information. Further, at this time, the SPS allocation information to a plurality of remote UEs 300 may be collectively notified to the base station apparatus 100. In addition, information may be informed that indicates an activation (Activation) state of the SPS transmission (i.e., whether the SPS transmission is activated (Activation) or deactivated (Deactivation). Provision of such information may allow, for example, the base station apparatus 100 to use a resource allocated for the SPS transmission in a case where the SPS transmission is not activated.

In addition, the information notified from the relay UE 200 may include, in particular, information regarding the resource for the UL transmission, among the resource allocated to the side link. In this case, the relay UE 200 provides the base station apparatus 100 with information regarding the resource allocated to the side link. Further, the information notified from the relay UE 200 may include information regarding a resource for the DL transmission, among the resource allocated to the side link. In this case, for example, it is possible to indirectly specify the resource allocated for the UL transmission on the basis of the information regarding the resource for the DL transmission, with respect to the resource allocated to the side link.

In addition, in a case where coordination of the UL transmission or the DL transmission via the Uu link is difficult, the base station apparatus 100 may request the relay UE 200 to change the allocation of a resource to a communication via the side link. In this case, the relay UE 200 may change the configuration (Configuration) of the UL/DL resource in the communication via the side link, upon reception of the request from the base station apparatus 100.

In addition, when requesting the relay UE 200 as described above, the base station apparatus 100 may specify a configuration of the UL/DL resource in the communication via the side link. In this case, the relay UE 200 changes the configuration of the UL/DL resource in the communication via the side link in accordance with the specifying. Alternatively, change may be made in the allocation of the SPS in the communication via the side link.

It is to be noted that examples of a method of notifying the above-described information include a method utilizing UL CCCH or UL DCCH. In addition, the above-described information may be notified as the RRC message. Further, in order to notify the above-described information, a new control message may be defined that is transmitted and received between the base station apparatus 100 and the relay UE 200.

Then, as illustrated in FIG. 20, when information is shared between the base station apparatus 100 and the relay UE 200, allocation of the resource to each of the wireless links is performed on the basis of the shared information such that no conflict (conflict) occurs between communications via mutually different wireless links (S105). That is, scheduling suppresses occurrence of a conflict between the communications via mutually different wireless links (a conflict is avoided).

Next, description is given of processing in a case where it is difficult to carry out coordination by the scheduler. As illustrated in FIG. 20, in a case where it is difficult to carry out the coordination by the scheduler (S101, NO), detection of a conflict (conflict) between communications via the mutually different wireless links is performed (S107). The detection of the conflict is performed on the basis of, for example, information on a timing of DL transmission notified from the base station apparatus 100, grant to UL transmission by the base station apparatus 100 via the side link, a timing of DL transmission via the side link notified from the relay UE 200, and the like.

When a conflict (conflict) between communications via the mutually different wireless links is detected, determination is made as to whether or not it is possible to multiplex the plurality of communications (i.e., whether or not multiplexing is possible) (S109).

(Simultaneous Transmission Determination Material 1: Power)

As a specific example, a terminal apparatus such as the relay UE 200 or the remote UE 300 may determine whether or not the multiplexing is possible on the basis of information regarding power available to the terminal apparatus itself. Specifically, there are constraints on the power available to the terminal apparatus. Accordingly, for example, the terminal apparatus itself may compare the power required to multiplex a plurality of communications via the mutually different wireless links and its own transmittable power with each other, and determine whether or not to perform the multiplexing on the basis of a result of the comparison. As a specific example, a Power head room value of the terminal apparatus may be used to determine whether or not the simultaneous transmission in the side link is possible. In addition, the determination may be made using a parameter such as MPR (Maximum Power Reduction) by CM (Cubic metric). Threshold information used for the determination may be subjected to Pre-configuration or may be set from the base station apparatus 100.

(Simultaneous Transmission Determination Material 2: TA)

Further, as another example, the terminal apparatus may determine whether or not the multiplexing is possible on the basis of TA (Timing Advance) in the UL transmission to the base station apparatus 100. Specifically, the terminal apparatus may perform the multiplexing in a case where the TA is within a threshold value. It is to be noted that the threshold value may be notified from, for example, the base station apparatus 100 or the relay UE 200. Alternatively, as another example, the threshold value may be subjected to the Pre-configuration.

(Simultaneous Transmission Determination Material 3: Frequency-Direction Distance)

Further, as another example, the terminal apparatus may determine whether or not the multiplexing is possible, depending on whether or not the frequency-direction distance between respective resources allocated to the UL transmission in the Uu link and the SL transmission is equal to or smaller than a threshold value. Specifically, the terminal apparatus may perform the multiplexing in a case where the frequency-direction distance exceeds the threshold value. It is to be noted that the threshold value may be notified from, for example, the base station apparatus 100 or the relay UE 200. Alternatively, as another example, the threshold value may be subjected to the Pre-configuration.

(Simultaneous Transmission Determination Material 4: IBE Estimation)

Further, as another example, the terminal apparatus may determine whether or not the multiplexing is possible, depending on whether or not the estimation result of IBE (In-Band Emission) from the Uu link (in particular, the Uu UL) is equal to or smaller than the threshold value. Specifically, the terminal apparatus may perform the multiplexing in a case where the estimation result of the IBE is equal to or smaller than the threshold value. It is to be noted that the threshold value may be notified from, for example, the base station apparatus 100 or the relay UE 200. Alternatively, as another example, the threshold value may be subjected to the Pre-configuration.

(Simultaneous Transmission Determination Material 5: Position of Terminal Apparatus)

Further, as another example, the terminal apparatus may determine whether or not the multiplexing is possible on the basis of information on its own position. In this case, the terminal apparatus may determine its own position on the basis of, for example, RSRP (Reference Signal Received Power) from the base station apparatus 100. Specifically, the terminal apparatus may determine to be positioned at a cell edge in a case where the RSRP is equal to or smaller than the threshold value, and may determine that it is difficult to perform the multiplexing. In addition, in a case where the terminal apparatus recognizes that the terminal apparatus itself is positioned at the cell center, execution of the multiplexing may be limited, in consideration of an influence of IBE interference on the Uu link (in particular, the Uu UL). It is to be noted that the threshold value may be notified from, for example, the base station apparatus 100 or the relay UE 200. Alternatively, as another example, the threshold value may be subjected to the Pre-configuration.

(Simultaneous Transmission Determination Material 6: Capability of Terminal Apparatus)

Further, as another example, the terminal apparatus may determine whether or not the multiplexing is possible, in accordance with capability information of the terminal apparatus itself. Examples of the capability information include Type information, UE category (UE category), antenna configuration (Antenna configuration), battery (Battery) information, and the number of remote terminals connected (Connect). The capability information may be set for each of the remote UE 300 and the relay UE 200. It is to be noted that the capability information required for the determination is exchanged in advance between the remote UE 300 and the relay UE 200 on the basis of a communication via the side link utilizing, for example, SCI (Shared Control Information) or MAC header.

(Simultaneous Transmission Determination Material 7: Presence or Absence of Instructions from Base Station Apparatus)

Further, as another example, the terminal apparatus may determine whether or not the multiplexing is possible, depending on presence or absence of an instruction from the base station apparatus 100. Specifically, in a case where the terminal apparatus has received an instruction from the base station apparatus 100 to stop the multiplexing, execution of the multiplexing may be limited. On the other hand, the terminal apparatus may perform the multiplexing unless otherwise instructed by the base station apparatus 100. Further, the terminal apparatus may limit the execution of the multiplexing in a case where the terminal apparatus receives a predetermined claim message from the base station apparatus 100.

It is to be noted that the above-described example is merely an example, and the method for determining whether or not to perform the multiplexing is not necessarily limited. In addition, determination may be made as to whether or not the multiplexing is possible by combining a plurality of determination conditions, among the various determination conditions described above.

Then, as illustrated in FIG. 20, in a case where determination is made that the multiplexing is possible (S109, YES), the terminal apparatus performs the multiplexing (S111). It is to be noted that, in this case, the method of multiplexing communications via mutually different wireless links is not particularly limited. For example, the terminal apparatus may perform the multiplexing by utilizing a piggy back (piggy back) transmission.

Specifically, there is a possibility that the relay UE 200 may transmit ACK/NACK to the remote UE 300 by the DL transmission via the side link. Under such a circumstance, the relay UE 200 may perform the piggy back transmission of SL ACK/NACK to the remote UE 300 upon the UL transmission to the base station apparatus 100 via the backhaul link. It is to be noted that, in this case, the resource for the UL transmission in the backhaul link is used for the transmission of the SL ACK/NACK. That is, the remote UE 300 needs to monitor the UL transmission via the backhaul link, in order to receive the SL ACK/NACK from the relay UE 200. Accordingly, the relay UE 200 may notify the remote UE 300 in advance whether or not to perform the piggy back transmission. It is to be noted that, for example, SL SCI (Sidelink Control Information) may be used for the notification. Alternatively, as another example, SBCH (Sidelink Broadcast Channel) may be utilized for the notification.

Further, as another example, there is a possibility that the relay UE 200 may transmit ACK/NACK to the base station apparatus 100 by the UL transmission via the Uu link. Under such a circumstance, the relay UE 200 may perform piggy back transmission of the ACK/NACK to the base station apparatus 100 upon DL transmission to the remote UE 300 via the side link. In this case, in order to receive the ACK/NACK, the base station apparatus 100 needs to monitor the DL transmission via the side link. Accordingly, the remote UE 300 may provide the base station apparatus 100 in advance with information to allow the base station apparatus 100 to perform the monitoring. It is to be noted that, for example, the RRC message may be utilized to provide the information.

Next, description is given of processing in a case where it is difficult to multiplex communications via mutually different wireless links. As illustrated in FIG. 20, in a case where it is difficult to multiplex communications via the mutually different wireless links (S109, NO), determination is made as to whether or not packet drop is possible for any of the wireless links in which a conflict (conflict) has occurred (S113).

(Packet Drop Determination Material 1: BS Information)

As a specific example, the terminal apparatus such as the relay UE 200 or the remote UE 300 may determine whether or not packet drop is possible for any of the wireless links in which a conflict has occurred, in accordance with BS (Buffer status) information. For example, in a case where the relay UE 200 recognizes that buffers are accumulated for the UL via the backhaul link on the basis of the BS information of the relay UE 200 itself, the relay UE 200 may prioritize the UL transmission via the backhaul link and drop a packet of the communication via the side link. In addition, in a case where the relay UE 200 recognizes that buffers are accumulated for the DL via the side link, the relay UE 200 may prioritize the DL transmission via the side link and drop a packet of the communication via the backhaul link.

(Packet Drop Determination Material 2: Packet Priority)

Further, as another example, the terminal apparatus may determine whether or not to drop a packet, or may determine which packet to be dropped, depending on priority of the packet. In this case, for example, transmission of the packet is performed after priority information is associated with each packet.

(Packet Drop Determination Material 3: Battery Remaining Amount)

Further, as another example, the terminal apparatus may determine whether or not to drop a packet, or may determine which packet to be dropped, in accordance with information regarding remaining amount of a battery of the terminal apparatus itself. As a specific example, in a case where the remaining amount of the battery of the terminal apparatus itself is small, the terminal apparatus may prioritize a packet of the communication via the side link with less power consumption to drop a packet of the UL transmission via the Uu link or the backhaul link.

(Packet Drop Determination Material 4: Number of Retransmissions)

Further, as another example, the terminal apparatus may compare the numbers of retransmissions of respective packets, and may determine whether or not to drop a packet or may determine which packet to be dropped, depending on results of the comparison. For example, the terminal apparatus may prioritize and transmit a packet with a larger number of retransmissions. As a more specific example, it is assumed that a packet of the UL transmission via the side link is the first transmission, whereas a packet of the UL transmission via the Uu link is the second retransmission. In this case, the remote UE 300 may prioritize and perform the UL transmission via the Uu link to drop a packet of the UL transmissions via the side link.

(Packet Drop Determination Material 5: Instructions from Base Station Apparatus)

Further, as another example, the terminal apparatus may determine whether or not to drop a packet or may determine which packet to be dropped, in accordance with an instruction from the base station apparatus 100. In this case, the base station apparatus 100 informs the terminal apparatus (i.e., the remote UE 300 or the relay UE 200) which of the communication via the Uu link or the backhaul link or the communication via the side link is prioritized. It is to be noted that the priority may be subjected to the Pre-configuration.

(Packet Drop Determination Material 6: Number of Remote Terminal Apparatus)

Further, as another example, the terminal apparatus may determine whether or not to drop a packet or may determine which packet to be dropped, depending on the number of the remote UE 300 in which simultaneous transmission is performed. For example, the terminal apparatus may make the above-described determinations depending on whether or not the number of the remote UE 300 in which the simultaneous transmission is performed is equal to or larger than a threshold value. In this case, the threshold value may be notified from, for example, the base station apparatus 100 or may be subjected to the Pre-configuration. As a more specific example, when the number of the remote UE 300 in which the simultaneous transmission is performed via the side link is 3 and the threshold value is 2, the communication via the side link is prioritized, and a packet of the UL transmission via the Uu link may be dropped.

(Packet Drop Determination Material 7: Number of Previous Drops)

Further, as another example, the terminal apparatus may determine whether or not to drop a packet or may determine which packet to be dropped, depending on the number of previous drops. In this case, the number of drops may be defined for each packet, or may be defined for each wireless link such as the side link, the Uu link (e.g., Uu UL), and the backhaul link. In addition, the number of definition of drops may be set by the base station apparatus 100 or may be subjected to the Pre-configuration in the terminal apparatus.

It is to be noted that the above-described example is merely an example, and does not necessarily limit the method for determining whether or not to drop a packet or for determining which packet to be dropped. In addition, determination may be made as to whether or not to drop a packet or which packet to be dropped, by combining a plurality of determination conditions among the various determination conditions described above.

Then, as illustrated in FIG. 20, in a case where determination is made that packet drop is possible (S113, YES), the terminal apparatus drops a packet determined as a target of the drop (S115).

It is to be noted that, in a case where packet drop is performed, recovery of the packet is carried out (S117) as illustrated in FIG. 20. At this time, priority of the dropped packet may be set higher to allow the dropped packet to be preferentially transmitted at the time of the next transmission. In addition, a transmission parameter related to the transmission of the dropped packet may be set to allow the dropped packet to be preferentially transmitted at the time of the next transmission. As a specific example, transmission power may be set to increase for the transmission of the packet, or the allocated resource may be controlled to increase. At this time, control contents of the transmission parameter, e.g., increase/decrease amount of the transmission power and increase/decrease amount of the allocated resource may be set by, for example, the base station apparatus 100, or may be subjected to the Pre-configuration in the terminal apparatus.

On the other hand, as illustrated in FIG. 20, in a case where determination is made that the packet drop is difficult (S113, NO), the terminal apparatus multiplexes, in a time direction, (TDM: Time Division Multiplexing) communications via mutually different wireless links in which a conflict (conflict) has occurred, and performs transmission (S119).

Description has been given above, with reference to FIG. 20, of an example of the control assuming a conflict (conflict) between pieces of transmission processing via mutually different wireless links, in the relay UE 200 and the remote UE 300.

3.2. Example of Control Assuming Conflict Between Pieces of Reception Processing Next, description is given of an example of a control assuming a conflict (conflict) between pieces of reception processing via mutually different wireless links, in the relay UE 200 and the remote UE 300.

Also in this case, similarly to the case between the pieces of transmission processing described above, in a case where the coordination (Coordination) by the scheduler is possible, the base station apparatus 100 and the relay UE 200 share various types of information, thereby making it possible to prevent occurrence of a conflict (conflict) between pieces of reception processing. Accordingly, the detailed description is omitted for the control in a case where the coordination (Coordination) by the scheduler is possible.

It is to be noted that, as for the case where the coordination (Coordination) by the scheduler is difficult, description is given separately for a case where the remote UE 300 performs reception and for a case where the relay UE 200 performs reception.

(Case where Remote UE 300 Performs Reception)

First, description is given of a case where the remote UE 300 performs reception. In the remote UE 300, there is a possibility that a conflict (conflict) may occur between DL reception via the side link and DL reception via the Uu link; a case of mainly receiving either of them may be assumed. Accordingly, description is given separately for the case of mainly receiving the DL via the side link and for the case of mainly receiving the DL via the Uu link.

First, description is given of the case of mainly receiving the DL via the side link. In a case where the DL via the side link is mainly received, when DL signal is transmitted via the Uu link, the remote UE 300 needs to perform switching to reception of the DL signal. In particular, there are cases where the switching to the DL signal is required for RRM measurement of a peripheral base station apparatus performed by the remote UE 300, for reception of a Paging message, and for reception of a synchronization signal, etc. from the base station apparatus 100. However, it is difficult for the remote UE 300 alone to recognize whether or not the DL signal is transmitted via the Uu link. Accordingly, in a case where the DL signal is transmitted via the Uu link, a mechanism for notifying the remote UE 300 of the transmission of the DL signal is required.

As an example of the above mechanism, there is a method in which the base station apparatus 100 notifies the remote UE 300 of a window of a DL to be monitored via the relay UE 200. Specifically, in a case where the DL transmission is performed via the Uu link, the base station apparatus 100 notifies the relay UE 200 that the DL transmission is performed to the remote UE 300. That is, the remote UE 300 sets a window where the DL signal is to be monitored. The notification is possible by utilizing, for example, predetermined signaling of the RRC message, etc., as well as DCI, etc. In addition, a window of the DL signal to be monitored may be set by using allocation information of a resource pool to the remote UE 300. In addition, upon reception of the notification from the base station apparatus 100, the relay UE 200 may notify the remote UE 300 via the side link that the DL transmission is performed from the base station apparatus 100 to the remote UE 300. It is to be noted that the notification is possible by utilizing predetermined signaling of the RRC message, etc. as well as SCI (Sidelink Control Information), etc., for example.

Further, as another example of the above mechanism, there is a method in which the relay UE 200 monitors the DL transmission from the base station apparatus 100 to the remote UE 300 via the Uu link, as a proxy of the remote UE 300. In this case, in a case where the relay UE 200 finds a DL signal via the Uu link addressed to the remote UE 300, the relay UE 200 may decode the DL signal and then transfer the decoded DL signal as a DL signal via the side link. Further, in a case where the relay UE 200 finds a DL control signal via the Uu link addressed to the remote UE 300, the relay UE 200 may notify the remote UE 300 that the DL signal has been transmitted via the Uu link without decoding data. In this case, upon reception of the notification from the relay UE 200, the remote UE 300 may switch the processing related to the reception of the DL signal via the side link to processing related to reception of the DL signal via the Uu link. In addition, the relay UE 200 may request the base station apparatus 100 to retransmit the DL signal to the remote UE 300 via the Uu link.

Alternatively, the relay UE 200 may refrain from sidelink transmission to the remote UE 300 to avoid a conflict. That is, the scheduler in the relay UE 200 is used to adjust the communication through the side link. In this case, the relay UE 200 needs to know DL transmission timing of the remote UE 300, a method of notifying the relay UE 200 of the DL transmission timing is required. One method is a method in which the base station apparatus 100 notifies the relay UE 200 of the DL transmission timing. The notification is possible by utilizing, for example, predetermined signaling of the RRC message, etc. as well as DCI, etc.

Further, the remote UE 300 may notify the relay UE 200 that the remote UE 300 monitors the DL signal. The relay UE 200 knows that the remote UE 300 monitors the DL signal, and thus the relay UE 200 does not perform the transmission through the side link during that period. It is to be noted that the notification is possible by utilizing, for example, predetermined signaling of the RRC message, etc. as well as SCI (Sidelink Control Information), etc. The signaling may include, as DL monitoring window information, information on monitoring start time, a period, a cycle, and the like.

Further, the remote UE 300 may decide to monitor the DL signal at its own discretion. For example, in a case where communication quality of the side link is deteriorated, the remote UE 300, on the basis information on the communication quality (SL-RSRP) of the side link, etc., starts monitoring of the DL signal and carries out handover to another base station. As information necessary for determining the communication quality of the side link, predetermined signaling of the RRC message, etc. may be used. Further, the remote UE 300 may start monitoring of the DL signal at a timing of paging allocated to the remote UE 300 itself. At the time of switching to the above-described DL signal monitoring, it is not possible to receive the side link signal, and thus the relay UE 200 is requested to stop the side link communication.

Next, description is given of a case where the remote UE 300 mainly receives the DL via the Uu link. In a case where the relay UE 200 needs to transmit a message to the remote UE 300, the relay UE 200 may transmit, to the base station apparatus 100, a connection request (Connection request) with the remote UE 300. The request is able to be made by utilizing, for example, predetermined signaling of the RRC message, etc. Further, the base station apparatus 100 performs the DL transmission via the Uu link to notify the remote UE 300 of an instruction regarding switching to the reception of the DL signal via the side link. The notification is possible by utilizing, for example, predetermined signaling of the RRC message, etc. as well as DCI, etc. It is to be noted that, at this time, the base station apparatus 100 may notify a plurality of remote UEs 300 all at once. Upon reception of the notification, the remote UE 300 switches the processing related to the reception of the DL signal via the Uu link to processing related to the reception of the DL signal via the side link. In addition, the relay UE 200 transmits the DL signal to the remote UE 300 via the side link.

Further, as another example, the relay UE 200 may utilize the DL signal via the Uu link to instruct the remote UE 300 to switch from the processing related to the reception of the DL signal via the Uu link to the processing related to the reception of the DL signal via the side link. In this case, the base station apparatus 100 may preferably reserve a resource for the relay UE 200 to perform transmission to the DL communication via the Uu link. In addition, the base station apparatus 100 may preferably notify the relay UE 200 of the reserved resource (i.e., the resource available to the relay UE 200). The notification is possible by utilizing, for example, SIB (System Information Block), the DCI, or the like. Further, the base station apparatus 100 may perform the above notification using a bitmap (Bitmap) table of the subframe (Subframe) and resource block information on a frequency.

(Case where Relay UE 200 Performs Reception)

Next, description is given of a case where the relay UE 200 performs reception. In the relay UE 200, there is a possibility that a conflict (conflict) may occur between DL reception via the backhaul link and UL reception via the side link; a case may be assumed where either of them is mainly received. Accordingly, description is given separately for a case of mainly receiving the DL via the backhaul link and for a case of mainly receiving the UL via the side link.

First, description is given of the case where the relay UE 200 mainly receives the DL via the backhaul link. For example, in a case where there is no response from the relay UE 200 to the UL transmission via the side link, the remote UE 300 recognizes that the relay UE 200 mainly receives the DL signal via the backhaul link. In this case, the remote UE 300 requests, by the UL transmission via the UL link, the base station apparatus 100 to cause the relay UE 200 to switch the processing related to the reception. The base station apparatus 100 notifies the relay UE 200 of the request from the remote UE 300 by the DL transmission via the backhaul link. Upon reception of the notification (i.e., the request for switching the processing related to reception) from the base station apparatus 100, it is sufficient for the relay UE 200 to switch the processing related to the reception of the DL signal via the backhaul link to the processing related to the reception of the UL signal via the side link. That is, it is sufficient for the relay UE 200 to switch the resource to be monitored, from the resource of the DL signal via the backhaul link to the resource of the UL signal via the side link.

Next, description is given of a case where the relay UE 200 mainly receives the UL via the side link. In a case where the base station apparatus 100 needs to transmit the DL signal to the relay UE 200 via the backhaul link, the base station apparatus 100 may instruct the relay UE 200, by utilizing the UL signal via the side link, to switch from the processing related to the reception of the UL signal via the side link to the processing related to the reception of the DL signal via the backhaul link. In a case where the relay UE 200 receives the instruction from the base station apparatus 100, it is sufficient for the relay UE 200 to switch the processing related to the reception of the UL signal via the side link to the processing related to the reception of the DL signal via the backhaul link. That is, it is sufficient for the relay UE 200 to switch the resource to be monitored, from the resource of the UL signal via the side link to the resource of the DL signal via the backhaul link.

Description has been given above of an example of a control assuming a conflict (conflict) between pieces of reception processing via mutually different wireless links, in the relay UE 200 and the remote UE 300.

3.3. Example of Control Assuming Conflict Between Transmission Processing and Reception Processing Next, description is given of an example of a control assuming a conflict (conflict) between transmission processing and reception processing via mutually different wireless links, in the relay UE 200 and the remote UE 300.

Also in this case, similarly to the above-described case of the pieces of transmission processing, in a case where the coordination (Coordination) by the scheduler is possible, the base station apparatus 100 and the relay UE 200 share various types of information, thereby making it possible to prevent the occurrence of a conflict (conflict) between the transmission processing and the reception processing. Accordingly, the detailed description of the control is omitted for a case where the coordination (Coordination) by the scheduler is possible.

It is to be noted that, as for the case where the coordination (Coordination) by the scheduler is difficult, description is given separately for a case focusing on transmission processing and reception processing in the relay UE 200 and for a case focusing on transmission processing and reception processing in the remote UE 300.

(Case Focusing on Transmission Processing and Reception Processing in Relay UE 200)

First, description is given of a case focusing on transmission processing and reception processing in the relay UE 200, i.e., a case where a conflict (conflict) may occur between the UL reception via the side link and the UL transmission via the backhaul link.

In this case, for example, it is sufficient for the relay UE 200 to perform a control to avoid the above-described conflict depending on circumstances. Specifically, it is sufficient for the relay UE 200 to carry out coordination (Coordination) by the scheduler. Further, as described above, the base station apparatus 100 may execute coordination (Coordination) by the scheduler. In this case, it is sufficient for the relay UE 200 to provide various types of information (e.g., information regarding UL communication via the side link) to the base station apparatus 100 to allow a resource to be allocated to UL communication via the backhaul link performed by the base station apparatus 100 such that no conflict as described above occurs.

Further, the relay UE 200 may also change Configuration of communication (in particular, UL transmission) via the side link in accordance with BSR (Buffer Status Report) related to the UL transmission via the backhaul link.

As a specific example, in a case where an amount of buffers accumulated for UL transmission via the backhaul link is large (e.g., in a case of equal to or larger than a threshold value), the relay UE 200 may change Configuration of the communication via the side link to allow the amount of communication for the UL transmission via the side link to be reduced. For the notification of Configuration to the remote UE 300, for example, SCI or SBCH (Sidelink Broadcast Channel), etc. may be utilized. In addition, the Configuration may be notified to the base station apparatus 100. In addition, predetermined signaling of the RRC message, etc. may be utilized for the notification of the Configuration.

Further, in a case where the amount of buffers accumulated for the UL transmission via the backhaul link is small (e.g., in a case of less than a threshold value), the relay UE 200 may change Configuration of a communication via the side link to allow the amount of communication for UL transmission via the side link to increase.

(Case Focusing on Transmission Processing and Reception Processing in Remote UE 300)

Next, description is given of a case focusing on transmission processing and reception processing in the remote UE 300, i.e., a case where a conflict (conflict) may occur between the DL reception via the side link and the UL transmission via the Uu link.

As a specific example, when traffic of UL communication in the Uu link between the remote UE 300 and the base station apparatus 100 increases, there is a case where it may be desirable to reduce the allocation of a resource to the DL communications via the side link. Thus, for example, the remote UE 300 may inform the relay UE 200 of information (e.g., the BSR) related to the traffic of the UL communications via the Uu link. Upon reception of the notification from the remote UE 300, the relay UE 200 may recognize a status of the traffic of the UL communication via the Uu link, and may control allocation of a resource to the DL communication via the side link in accordance with the status of the traffic.

More specifically, the relay UE 200 may change Configuration of the DL communication via the side link in response to the notification from the remote UE 300. For the notification of Configuration to the remote UE 300, for example, SCI or SBCH (Sidelink Broadcast Channel), etc. may be utilized. In addition, the Configuration may be notified to the base station apparatus 100. In addition, predetermined signaling of the RRC message, etc. may be utilized for the notification of the Configuration.

4. Application Example

The technique according to the present disclosure is applicable to a variety of products. For example, the base station apparatus 100 may be achieved as any type of eNB (evolved Node B), such as a macro eNB or a small eNB. The small eNB may be an eNB that covers a smaller cell than a macro cell, such as a pico eNB, a micro eNB, or a home (femto) eNB. Alternatively, the base station apparatus 100 may be achieved as a NodeB or another type of base station such as BTS (Base Transceiver Station). The base station apparatus 100 may include a main body (also referred to as a base station apparatus) that controls a wireless communication, and one or more RRHs (Remote Radio Head) disposed at different locations from the main body. Further, various types of terminals described later may temporarily or semi-permanently perform base station functions to thereby operate as the base station apparatus 100.

In addition, for example, the terminal apparatus 200 or 300 may be achieved as a smartphone, a tablet PC (Personal Computer), a notebook PC, a portable game terminal, a mobile terminal such as a portable/dongle type mobile router or a digital camera, or an in-vehicle terminal such as a car navigation apparatus. In addition, the terminal apparatus 200 or 300 may be achieved as a terminal (also referred to as MTC (Machine Type Communication) terminal) that performs M2M (Machine To Machine) communication. Further, the terminal apparatus 200 or 300 may be a wireless communication module (e.g., an integrated circuit module configured by one base station apparatus 100 die) mounted on these terminals.

4.1. Application Example of Base Station

First Application Example

FIG. 21 is a block diagram illustrating a first example of a schematic configuration of an eNB to which the technique according to the present disclosure is applicable. An eNB 800 includes one or more antennas 810 and a base station apparatus 820. Each antenna 810 and the base station apparatus 820 may be coupled to each other via an RF cable.

Each of the antennas 810 includes a single antenna element or a plurality of antenna elements (e.g., the plurality of antenna elements configuring a MIMO antenna), and is used for transmission and reception of a radio signal by the base station apparatus 820. The eNB 800 may include the plurality of antennas 810 as illustrated in FIG. 21, and the plurality of antennas 810 may correspond, respectively, to a plurality of frequency bands used by the eNB 800, for example. It is to be note that, although FIG. 21 illustrates an example in which the eNB 800 includes the plurality of antennas 810, the eNB 800 may also include a single antenna 810.

The base station apparatus 820 includes a controller 821, a memory 822, a network interface 823, and a wireless communication interface 825.

The controller 821 may be, for example, a CPU or a DSP, and operates various functions of upper layers of the base station apparatus 820. For example, the controller 821 generates a data packet from data in a signal processed by the wireless communication interface 825, and transfers the generated packet via the network interface 823. The controller 821 may generate a bundled packet by bundling data from a plurality of baseband processors, and may transfer the generated bundled packets. In addition, the controller 821 may have logical functions of performing controls such as radio resource control (Radio Resource Control), radio bearer control (Radio Bearer Control), mobility management (Mobility Management), admission control (Admission Control), or scheduling (Scheduling). Further, the control may also be executed in conjunction with a peripheral eNB or a core network node. The memory 822 includes a RAM and a ROM, and stores programs executed by the controller 821 and various types of control data (e.g., a terminal list, transmission power data, and scheduling data).

The network interface 823 is a communication interface for coupling the base station apparatus 820 to a core network 824. The controller 821 may communicate with a core network node or another eNB via the network interface 823. In such a case, the eNB 800 and the core network node or the other eNB may be coupled to each other by a logical interface (e.g., an S1 interface or an X2 interface). The network interface 823 may be a wired communication interface or may be a wireless communication interface for wireless backhaul. In a case where the network interface 823 is a wireless communication interface, the network interface 823 may use a higher frequency band for wireless communications than a frequency band used by the wireless communication interface 825.

The wireless communication interface 825 supports any cellular communication method, such as LTE (Long Term Evolution) or LTE-Advanced, and provides wireless coupling to a terminal positioned in a cell of the eNB 800 via the antenna 810. The wireless communication interface 825 may typically include a base band (BB) processor 826 and an RF circuit 827, etc. The BB processor 826 may perform, for example, encoding/decoding, modulation/demodulation, multiplexing/demultiplexing, and the like, and executes various types of signal processing of layers (e.g., L1, MAC (Medium Access Control), RLC (Radio Link Control), and PDCP (Packet Data Convergence Protocol)). Instead of the controller 821, the BB processor 826 may have some or all of the logical functions described above. The BB processor 826 may be a module including a memory that stores a communication control program, a processor that executes the program, and related circuits; the function of the BB processor 826 may be changeable by updating the program. In addition, the module may be a card or a blade to be inserted into a slot of the base station apparatus 820, or may be a chip mounted on the card or the blade. Meanwhile, the RF circuit 827 may include a mixer, a filter, an amplifier, and the like, and transmits and receives radio signals via the antenna 810.

The wireless communication interface 825 includes a plurality of BB processors 826 as illustrated in FIG. 21, and the plurality of BB processors 826 may correspond, respectively, to the plurality of frequency bands used by the eNB 800, for example. Further, as illustrated in FIG. 21, the wireless communication interface 825 may include a plurality of RF circuits 827, and the plurality of RF circuits 827 may correspond, respectively, to a plurality of antenna elements, for example. It is to be noted that FIG. 21 illustrates an example in which the wireless communication interface 825 includes the plurality of BB processors 826 and the plurality of RF circuits 827; however, the wireless communication interface 825 may include a single BB processor 826 or a single RF circuit 827.

In the eNB 800 illustrated in FIG. 21, one or more components (the setting section 151 and/or the communication control section 153) included in the base station apparatus 100 described with reference to FIG. 10 may be implemented in the wireless communication interface 825. Alternatively, at least some of these components may be implemented in the controller 821. As an example, the eNB 800 may be mounted with a module that includes some (e.g., the BB processor 826) or all of the wireless communication interface 825, and/or the controller 821; the one or more components may be implemented in the module. In this case, the module may store a program for causing the processor to function as the one or more components (in other words, a program for causing the processor to execute operations of the one or more components), and may execute the program. As another example, the program for causing the processor to function as the one or more components may be installed in the eNB 800, and the wireless communication interface 825 (e.g., the BB processor 826) and/or the controller 821 may execute the program. As described above, the eNB 800, the base station apparatus 820 or the module may be provided as an apparatus including the one or more components, and the program for causing the processor to function as the one or more components may be provided. In addition, a readable recording medium in which the program is recorded may be provided.

In addition, in the eNB 800 illustrated in FIG. 21, the wireless communication unit 120 described with reference to FIG. 10 may also be implemented in the wireless communication interface 825 (e.g., the RF circuit 827). In addition, the antenna unit 110 may also be implemented in the antenna 810. In addition, the network communication unit 130 may also be implemented in the controller 821 and/or the network interface 823. In addition, the storage unit 140 may also be implemented in the memory 822.

Second Application Example

FIG. 22 is a block diagram illustrating a second example of a schematic configuration of an eNB to which the technique according to the present disclosure is applicable. An eNB 830 includes one or more antennas 840, a base station apparatus 850, and an RRH 860. Each antenna 840 and the RRH 860 may be coupled to each other via an RF cable. In addition, the base station apparatus 850 and the RRH 860 may be coupled to each other by a high-speed line such as an optical fiber cable.

Each of the antennas 840 includes a single antenna element or a plurality of antenna elements (e.g., the plurality of antenna elements configuring the MIMO antenna), and is used for transmission and reception of a radio signal by the RRH 860. The eNB 830 may include a plurality of antennas 840 as illustrated in FIG. 22, and the plurality of antennas 840 may correspond, respectively, to a plurality of frequency bands used by the eNB 830, for example. It is to be note that, although FIG. 22 illustrates an example in which the eNB 830 includes the plurality of antennas 840, the eNB 830 may also include a single antenna 840.

The base station apparatus 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 21.

The wireless communication interface 855 supports any cellular communication method, such as LTE or LTE-Advanced, and provides wireless coupling to a terminal positioned in a sector corresponding to the RRH 860, via the RRH 860 and the antenna 840. The wireless communication interface 855 may typically include a BB processor 856 or the like. The BB processor 856 is similar to the BB processor 826 described with reference to FIG. 21, except that the BB processor 856 is coupled to an RF circuit 864 of the RRH 860 via the coupling interface 857. The wireless communication interface 855 includes a plurality of BB processors 856 as illustrated in FIG. 22, and the plurality of BB processors 856 may correspond, respectively, to a plurality of frequency bands used by the eNB 830, for example. It is to be noted that, although FIG. 22 illustrates an example in which the wireless communication interface 855 includes the plurality of BB processors 856, the wireless communication interface 855 may include a single BB processor 856.

The coupling interface 857 is an interface for coupling the base station apparatus 850 (the wireless communication interface 855) to the RRH 860. The coupling interface 857 may be a communication module for communication by the high-speed line, which couples the base station apparatus 850 (the wireless communication interface 855) and the RRH 860 to each other.

Further, the RRH 860 includes a coupling interface 861 and a wireless communication interface 863.

The coupling interface 861 is an interface for coupling the RRH 860 (the wireless communication interface 863) to the base station apparatus 850. The coupling interface 861 may be a communication module for communication by the high-speed line.

The wireless communication interface 863 transmits and receives radio signals via the antenna 840. The wireless communication interface 863 may typically include the RF circuit 864 or the like. The RF circuit 864 may include a mixer, a filter, an amplifier, and the like, and transmits and receives radio signals via the antenna 840. The wireless communication interface 863 includes a plurality of RF circuits 864 as illustrated in FIG. 22, and the plurality of RF circuits 864 may correspond, respectively, to a plurality of antenna elements, for example. It is to be noted that, although FIG. 22 illustrates an example in which the wireless communication interface 863 includes the plurality of RF circuits 864, the wireless communication interface 863 may include a single RF circuit 864.

In the eNB 830 illustrated in FIG. 22, one or more components (the setting section 151 and/or the communication control section 153) included in the base station apparatus 100 described with reference to FIG. 10 may be implemented in the wireless communication interface 855 and/or the wireless communication interface 863. Alternatively, at least some of these components may be implemented in the controller 851. As an example, the eNB 830 may be mounted with a module that includes some (e.g., the BB processor 856) or all of the wireless communication interface 855, and/or the controller 851; the one or more components may be implemented in the module. In this case, the module may store a program for causing the processor to function as the one or more components (in other words, a program for causing the processor to execute operations of the one or more components), and may execute the program. As another example, the program for causing the processor to function as the one or more components may be installed in the eNB 830, and the wireless communication interface 855 (e.g., the BB processor 856) and/or the controller 851 may execute the program. As described above, the eNB 830, the base station apparatus 850, or the module may be provided as an apparatus including the one or more components, and the program for causing the processor to function as the one or more components may be provided. Further, a readable recording medium in which the program is recorded may be provided.

In addition, in the eNB 830 illustrated in FIG. 22, for example, the wireless communication unit 120 described with reference to FIG. 10 may also be implemented in the wireless communication interface 863 (e.g., the RF circuit 864). In addition, the antenna unit 110 may also be implemented in the antenna 840. In addition, the network communication unit 130 may also be implemented in the controller 851 and/or the network interface 853. In addition, the storage unit 140 may also be implemented in the memory 852.

4.2. Application Examples of Terminal Apparatus (First Application)

FIG. 23 is a block diagram illustrating an example of a schematic configuration of a smartphone 900 to which a technique of the present disclosure is applicable. The smartphone 900 includes a processor 901, a memory 902, a storage 903, an external coupling interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or an SoC (System on Chip), and controls functions of an application layer and the other layers of the smartphone 900. The memory 902 includes a RAM and a ROM, and stores a program to be executed by the processor 901 and data. The storage 903 may include a storage medium such as a semiconductor memory or a hard disk. The external coupling interface 904 is an interface for coupling an external device such as a memory card or a USB (Universal Serial Bus) device to the smartphone 900.

The camera 906 includes an imaging element such as a CCD (Charge Coupled Device) or a CMOS(Complementary Metal Oxide Semiconductor), for example, and generate a captured image. The sensor 907 may include, for example, a group of sensors such as a positioning sensor, a gyro sensor, a geomagnetic sensor, and an acceleration sensor. The microphone 908 converts audio inputted to the smartphone 900 to an audio signal. The input device 909 includes, for example, a touch sensor that detects a touch on a screen of the display device 910, a keypad, a keyboard, a button, or a switch, etc., and accepts an operation or information input from a user. The display device 910 includes a screen such as a liquid crystal display (LCD) or an organic light-emitting diode (OLED) display, and displays an output image of the smartphone 900. The speaker 911 converts an audio signal outputted from the smartphone 900 to audio.

The wireless communication interface 912 supports any cellular communication method, such as LTE or LTE-Advanced, and executes a wireless communication. The wireless communication interface 912 may typically include a BB processor 913 and an RF circuit 914, etc. The BB processor 913 may perform, for example, encoding/decoding, modulation/demodulation, multiplexing/demultiplexing, and the like, and executes various types of signal processing for the wireless communication. Meanwhile, the RF circuit 914 may include a mixer, a filter, an amplifier, and the like, and transmits and receives radio signals via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 23. It is to be noted that, although FIG. 23 illustrates an example in which the wireless communication interface 912 includes the plurality of BB processors 913 and the plurality of RF circuits 914, the wireless communication interface 912 may include a single BB processor 913 or a single RF circuit 914.

Further, the wireless communication interface 912 may support other types of wireless communication methods, such as a near field communication method, a proximity wireless communication method, or a wireless LAN (Local Area Network) method, in addition to a cellular communication method; in that case, the wireless communication interface 912 may include the BB processor 913 and the RF circuit 914 for each wireless communication method.

Each of the antenna switches 915 switches a coupling destination of the antenna 916 among a plurality of circuits (e.g., circuits for different wireless communication methods) included in the wireless communication interface 912.

Each of the antennas 916 includes a single antenna element or a plurality of antenna elements (e.g., the plurality of antenna elements configuring the MIMO antenna), and is used for transmission and reception of a radio signal by the wireless communication interface 912. The smartphone 900 may include a plurality of antennas 916 as illustrated in FIG. 23. It is to be noted that, although FIG. 23 illustrates an example in which the smartphone 900 includes the plurality of antennas 916, the smartphone 900 may also include a single antenna 916.

Further, the smartphone 900 may include the antenna 916 for each wireless communication method. In that case, the antenna switch 915 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 912, and the auxiliary controller 919 to one another. The battery 918 supplies power to each block of the smartphone 900 illustrated in FIG. 23 via a feed line partially indicated by a broken line in the drawing. The auxiliary controller 919 operates the minimum necessary functions of the smartphone 900, for example, in a sleep mode.

In the smartphone 900 illustrated in FIG. 23, one or more components (measurement processing section 241 and/or communication control section 243) included in the relay UE 200 described with reference to FIG. 11, or one or more components (measurement processing section 341 and/or communication control section 343) included in the remote UE 300 described with reference to FIG. 12 may be implemented in the wireless communication interface 912. Alternatively, at least some of these components may be implemented in the processor 901 or the auxiliary controller 919. As an example, the smartphone 900 may be mounted with a module that includes some (e.g., the BB processor 913) or all of the wireless communication interface 912, the processor 901, and/or the auxiliary controller 919; the one or more components may be implemented in the module. In this case, the module may store a program for causing the processor to function as the one or more components (in other words, a program for causing the processor to execute operations of the one or more components), and may execute the program. As another example, the program for causing the processor to function as the one or more components may be installed in the smartphone 900, and the wireless communication interface 912 (e.g., the BB processor 913), the processor 901, and/or the auxiliary controller 919 may execute the program. As described above, the smartphone 900 or the module may be provided as an apparatus including the one or more components, and the program for causing the processor to function as the one or more components may be provided. In addition, a readable recording medium in which the program is recorded may be provided.

In addition, in the smartphone 900 illustrated in FIG. 23, for example, the wireless communication unit 220 described with reference to FIG. 11 or the wireless communication unit 320 described with reference to FIG. 12 may be implemented in the wireless communication interface 912 (e.g., the RF circuit 914). In addition, the antenna unit 210 or the antenna unit 310 may be implemented in the antenna 916. In addition, the storage unit 230 or the storage unit 330 may be implemented in the memory 902.

Second Application Example

FIG. 24 is a block diagram illustrating an example of a schematic configuration of a car navigation apparatus 920 to which a technique of the present disclosure is applicable. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation apparatus 920. The memory 922 includes a RAM and a ROM, and stores a program to be executed by the processor 921 and data.

The GPS module 924 uses a GPS signal received from a GPS satellite to measure a position (e.g., latitude, longitude, and altitude) of the car navigation apparatus 920. The sensor 925 may include, for example, a group of sensors such as a gyro sensor, a geomagnetic sensor, and a barometric sensor. The data interface 926 is coupled to an in-vehicle network 941 via an unillustrated terminal, for example, and acquires data generated on side of a vehicle, such as vehicle speed data.

The content player 927 reproduces contents stored in a storage medium (e.g., CD or DVD) to be inserted into the storage medium interface 928. The input device 929 includes, for example, a touch sensor that detects a touch on a screen of the display device 930, a button, or a switch, etc., and accepts an operation or information input from a user. The display device 930 includes a screen such as an LCD or an OLED display, and displays navigation functions or images of contents to be reproduced. The speaker 931 outputs navigation functions or audio of contents to be reproduced.

The wireless communication interface 933 supports any cellular communication method, such as LTE or LTE-Advanced, and executes a wireless communication. The wireless communication interface 933 may typically include a BB processor 934 and an RF circuit 935, etc. The BB processor 934 may perform, for example, encoding/decoding, modulation/demodulation, multiplexing/demultiplexing, and the like, and executes various types of signal processing for wireless communications. Meanwhile, the RF circuit 935 may include a mixer, a filter, an amplifier, and the like, and transmits and receives radio signals via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 24. It is to be noted that, although FIG. 24 illustrates an example in which the wireless communication interface 933 includes the plurality of BB processors 934 and the plurality of RF circuits 935, the wireless communication interface 933 may include a single BB processor 934 or a single RF circuit 935.

In addition, the wireless communication interface 933 may support other types of wireless communication methods, such as a near field communication method, a close proximity wireless communication method, or a wireless LAN method, in addition to a cellular communication method; in that case, the wireless communication interface 933 may include the BB processor 934 and the RF circuit 935 for each wireless communication method.

Each of the antenna switches 936 switches a coupling destination of the antenna 937 among a plurality of circuits (e.g., circuits for different wireless communication methods) included in the wireless communication interface 933.

Each of the antennas 937 includes a single antenna element or a plurality of antenna elements (e.g., a plurality of antenna elements configuring the MIMO antenna), and is used for transmission and reception of a radio signal by the wireless communication interface 933. The car navigation apparatus 920 may include a plurality of antennas 937 as illustrated in FIG. 24. It is to be noted that, although FIG. 24 illustrates an example in which the car navigation apparatus 920 includes the plurality of antennas 937, the car navigation apparatus 920 may also include a single antenna 937.

Further, the car navigation apparatus 920 may include the antenna 937 for each wireless communication method. In that case, the antenna switch 936 may be omitted from the configuration of the car navigation apparatus 920.

The battery 938 supplies power to each block of the car navigation apparatus 920 illustrated in FIG. 24 via a feed line partially indicated by a broken line in the drawing. In addition, the battery 938 accumulates power fed from side of a vehicle.

In the car navigation apparatus 920 illustrated in FIG. 24, one or more components (measurement processing section 241 and/or communication control section 243) included in the relay UE 200 described with reference to FIG. 11 or one or more components (measurement processing section 341 and/or communication control section 343) included in the remote UE 300 described with reference to FIG. 12 may be implemented in the wireless communication interface 933. Alternatively, at least some of these components may be implemented in the processor 921. As an example, the car navigation apparatus 920 may be mounted with a module including some (e.g., the BB processor 934) or all of the wireless communication interface 933 and/or the processor 921; the one or more components may be implemented in the module. In this case, the module may store a program for causing the processor to function as the one or more components (in other words, a program for causing the processor to execute operations of the one or more components), and may execute the program. As another example, the program for causing the processor to function as the one or more components may be installed in the car navigation apparatus 920, and the wireless communication interface 933 (e.g., the BB processor 934) and/or the processor 921 may execute the program. As described above, the car navigation apparatus 920 or the module may be provided as an apparatus including the one or more components, and the program for causing the processor to function as the one or more components may be provided. In addition, a readable recording medium in which the program is recorded may be provided.

In addition, in the car navigation apparatus 920 illustrated in FIG. 24, for example, the wireless communication unit 220 described with reference to FIG. 11 or the wireless communication unit 320 described with reference to FIG. 12 may be implemented in the wireless communication interface 933 (e.g., the RF circuit 935). In addition, the antenna unit 210 or the antenna unit 310 may be implemented in the antenna 937. In addition, the storage unit 230 or storage unit 330 may be implemented in the memory 922.

The technique according to the present disclosure may also be achieved as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, an engine speed, or failure information, and outputs the generated data to the in-vehicle network 941.

5. Closing

As described above, in the system according to the present embodiment, the base station apparatus 100 may provide control information regarding allocation of a resource for a communication with the remote UE 300 via the Uu link, to the relay UE 200 via the backhaul link. In this case, the Uu link corresponds to an example of a "first wireless link", and the remote UE 300 corresponds to an example of a "first apparatus". In addition, the backhaul link corresponds to an example of a "second wireless link", and the relay UE 200 corresponds to an example of a "second apparatus". In addition, the side link corresponds to an example of a "third wireless link".

Further, as another example, the relay UE 200 may provide control information regarding allocation of a resource for a communication with the remote UE 300 via the side link, to the base station apparatus 100 via the backhaul link. In this case, the side link corresponds to an example of a "first wireless link", and the remote UE 300 corresponds to an example of a "first apparatus". In addition, the backhaul link corresponds to an example of a "second wireless link", and the base station apparatus 100 corresponds to an example of a "second apparatus". In addition, the Uu link corresponds to an example of a "third wireless link".

With the above-described configuration, according to the system of the present embodiment, it is possible to prevent occurrence of a conflict (conflict) in the transmission device or the reception device between communications via mutually different wireless links, in the relay UE 200 and the remote UE 300.

In addition, in a case where provision of the control information between the base station apparatus 100 and the relay UE 200 (i.e., coordination (Coordination) by the scheduler) is difficult, a terminal apparatus such as the remote UE 300 or the relay UE 200 may perform a control for avoiding the occurrence of the conflict. For example, in a case where the occurrence of the conflict may be assumed, the terminal apparatus may avoid the occurrence of the conflict by multiplexing communications via the mutually different wireless links. In addition, as another example, the terminal apparatus may avoid the occurrence of the conflict by dropping any of data (packet) transmitted by communications via the mutually different wireless links. In addition, as another example, the terminal apparatus may avoid the occurrence of the conflict by multiplexing (i.e., performing time division on) communications via the mutually different wireless links in a time direction.

With the above-described configuration, according to the system of the present embodiment, even in a case where a transmission device or a reception device available to a terminal apparatus applied as the remote UE or the relay UE is limited, it is possible to achieve higher-quality FeD2D communication.

The preferred embodiments of the present disclosure have been described above with reference to the accompanying drawings, whilst the present disclosure is not limited to the above examples. It is obvious that a person having ordinary skill in the art may find various alterations or modifications within the scope of the technical idea set forth in the appended claims, and it should be understood that these alterations and modifications naturally come under the technical scope of the present disclosure.

Further, the effects described herein are merely illustrative or exemplary, and are not limitative. That is, the technique according to the present disclosure may achieve, in addition to or in place of the above effects, other effects that are obvious to those skilled in the art from the description of the present specification. It is to be noted that the technical scope of the present disclosure also includes the following configurations.

(1)

A communication apparatus including:
a communication unit that performs a wireless communication; and
a control unit that performs a control to cause control information regarding allocation of a resource for a communication with a first apparatus via a first wireless link to be notified to a second apparatus via a second wireless link.

(2)

The communication apparatus according to (1), in which
the first apparatus includes a remote communication apparatus, and
the second apparatus includes a relay communication apparatus configured to be movable.

(3)

The communication apparatus according to (2), in which
the control unit controls allocation of a resource to a third wireless link between the relay communication apparatus and the remote communication apparatus, and
the control information includes information regarding the third wireless link.

(4)

The communication apparatus according to (3), in which
the information regarding the third wireless link includes information regarding setting of a communication via the third wireless link.

(5)

The communication apparatus according to (3) or (4), in which the control unit allocates a resource pool to the third wireless link, and
the information regarding the third wireless link includes information regarding the resource pool.

(6)

The communication apparatus according to any one of (3) to (5), in which
the control unit quasi-statically allocates a resource to the third wireless link, and
the information regarding the third wireless link includes information regarding activation or deactivation of the allocation of the resource.

(7)

The communication apparatus according to any one of (2) to (6), in which the control information includes uplink grant information in at least one of the remote communication apparatus or the relay communication apparatus.

(8)

The communication apparatus according to any one of (2) to (7), in which the control information includes information regarding a resource for at least one of the remote communication apparatus or the relay communication apparatus to transmit a response to a downlink transmission.

(9)

The communication apparatus according to (1), configured to be mobile, in which
the first apparatus includes a remote communication apparatus, and
the second apparatus includes a base station apparatus.

(10)

The communication apparatus according to (9), in which the control information includes information regarding setting of the communication via the first wireless link.

(11)

The communication apparatus according to (9) or (10), in which
the control unit allocates a resource pool to the first wireless link, and
the control information includes information regarding the resource pool.

(12)

The communication apparatus according to any one of (9) to (11), in which
the control unit quasi-statically allocates a resource to the first wireless link, and
the control information includes information regarding activation or deactivation of the allocation of the resource.

(13)

The communication apparatus according to any one of (9) to (12), in which the control unit controls the allocation of the resource for the communication with the first apparatus via the first wireless link on a basis of a request from the second apparatus via the second wireless link.

(14)

The communication apparatus according to any one of (9) to (13), configured to be movable by being held by a mobile object.

(15)

The communication apparatus according to (1), in which
the first apparatus includes a remote communication apparatus that communicates with a relay communication apparatus configured to be movable via a third wireless link, and
at least one of the relay communication apparatus or the remote communication apparatus controls, in a case where a conflict is detected between the communication via the first wireless link and a communication via the third wireless link, the respective communications via the first wireless link and the third wireless link.

(16)

The communication apparatus according to (15), in which at least one of the relay communication apparatus or the remote communication apparatus multiplexes the communication via the first wireless link and the communication via the third wireless link depending on a predetermined condition in a case where the conflict is detected.

(17)

The communication apparatus according to (16), in which at least one of the relay communication apparatus or the remote communication apparatus multiplexes the communication via the first wireless link and the communication via the third wireless link depending on transmittable power in the wireless communication.

(18)

The communication apparatus according to (16), in which at least one of the relay communication apparatus or the remote communication apparatus multiplexes the communication via the first wireless link and the communication via the third wireless link depending on a position in a cell.

(19)

The communication apparatus according to (16), in which at least one of the relay communication apparatus or the remote communication apparatus multiplexes the communication via the first wireless link and the communication via the third wireless link depending on capability of the communication apparatus itself.

(20)

The communication apparatus according to (16), in which at least one of the relay communication apparatus or the remote communication apparatus multiplexes the communication via the first wireless link and the communication via the third wireless link depending on an instruction from a base station apparatus.

(21)

The communication apparatus according to (15), in which at least one of the relay communication apparatus or the remote communication apparatus drops one of data transmitted via the first wireless link and data transmitted via the third wireless link depending on a predetermined condition in a case where the conflict is detected.

(22)

The communication apparatus according to (21), in which at least one of the relay communication apparatus or the remote communication apparatus drops one of the data transmitted via the first wireless link and the data transmitted via the third wireless link, depending on a communication status of at least one of the communication via the first wireless link or the communication via the third wireless link.

(23)

The communication apparatus according to (22), in which at least one of the relay communication apparatus or the remote communication apparatus drops one of the data transmitted via the first wireless link and the data transmitted via the third wireless link, depending on a status of usage of a buffer for at least one of the communication via the first wireless link or the communication via the third wireless link.

(24)

The communication apparatus according to (22), in which at least one of the relay communication apparatus or the remote communication apparatus drops one of the data transmitted via the first wireless link and the data transmitted via the third wireless link, depending on number of retransmissions of at least one of the communication via the first wireless link or the communication via the third wireless link.

(25)

The communication apparatus according to (21), in which at least one of the relay communication apparatus or the remote communication apparatus determines data to be dropped, depending on priority set for at least one of the data transmitted via the first wireless link or the data transmitted via the third wireless link.

(26)

A communication method including causing a computer to
perform a wireless communication, and
perform a control to cause information regarding a resource allocated for a communication with a first apparatus via a first wireless link to be notified to a second apparatus via a second wireless link.

REFERENCE NUMERALS LIST 1 system
100 base station apparatus
110 antenna unit
120 wireless communication unit
130 network communication unit
140 storage unit
150 control unit
151 setting section
153 communication control section
200 relay UE
210 antenna unit 220 wireless communication unit
230 storage unit
240 control unit
241 setting section
243 determination section
245 communication control section
300 remote UE
310 antenna unit
320 wireless communication unit
330 storage unit
340 control unit
341 determination section
343 communication control section

What is claimed is:

1. A communication apparatus, comprising:
circuitry configured to:
perform a wireless communication;
control notification of control information, regarding allocation of a resource for a communication with a first apparatus via a first wireless link, to a second apparatus via a second wireless link, wherein
the communication apparatus is configured to be mobile,
the first apparatus comprises a remote communication apparatus, and
the second apparatus comprises a base station apparatus; and
control, based on a request from the second apparatus via the second wireless link, the allocation of the resource for the communication with the first apparatus via the first wireless link.

2. The communication apparatus according to claim 1, wherein
the circuitry is further configured to control, in a case where the second apparatus comprises a relay communication apparatus, allocation of a resource to a third wireless link between the relay communication apparatus and the remote communication apparatus, and
the control information includes information regarding the third wireless link.

3. The communication apparatus according to claim 2, wherein the information regarding the third wireless link includes information regarding setting of a communication via the third wireless link.

4. The communication apparatus according to claim 2, wherein
the circuitry is further configured to allocate a resource pool to the third wireless link, and
the information regarding the third wireless link includes information regarding the resource pool.

5. The communication apparatus according to claim 2, wherein
the circuitry is further configured to quasi-statically allocate the resource to the third wireless link, and
the information regarding the third wireless link includes information regarding activation or deactivation of the allocation of the resource to the third wireless link.

6. The communication apparatus according to claim 2, wherein the control information further includes uplink grant information in at least one of the remote communication apparatus or the relay communication apparatus.

7. The communication apparatus according to claim 2, wherein the control information further includes information regarding a resource for at least one of the remote communication apparatus or the relay communication apparatus to transmit a response to a downlink transmission.

8. The communication apparatus according to claim 1, wherein the control information further includes information regarding setting of the communication via the first wireless link.

9. The communication apparatus according to claim 1, wherein
the circuitry is further configured to allocate a resource pool to the first wireless link, and
the control information further includes information regarding the resource pool.

10. The communication apparatus according to claim 1, wherein
the circuitry is further configured to quasi-statically allocate the resource to the first wireless link, and
the control information further includes information regarding activation or deactivation of the allocation of the resource to the first wireless link.

11. The communication apparatus according to claim 1, wherein the communication apparatus is movable by being held by a mobile object.

12. The communication apparatus according to claim 1, wherein
the remote communication apparatus communicates with a relay communication apparatus via a third wireless link,
the relay communication apparatus is movable, and
at least one of the relay communication apparatus or the remote communication apparatus controls, in a case where a conflict is detected between the communication via the first wireless link and a communication via the third wireless link, the communication via the first wireless link and the communication via the third wireless link.

13. The communication apparatus according to claim 12, wherein the at least one of the relay communication apparatus or the remote communication apparatus multiplexes the communication via the first wireless link and the communication via the third wireless link, based on a specific condition and the detection of the conflict.

14. The communication apparatus according to claim 13, wherein the at least one of the relay communication apparatus or the remote communication apparatus further multiplexes the communication via the first wireless link and the communication via the third wireless link, based on transmittable power in the wireless communication.

15. The communication apparatus according to claim 13, wherein the at least one of the relay communication apparatus or the remote communication apparatus further multiplexes the communication via the first wireless link and the communication via the third wireless link, based on a position in a cell.

16. The communication apparatus according to claim 13, wherein the at least one of the relay communication apparatus or the remote communication apparatus further multiplexes the communication via the first wireless link and the communication via the third wireless link, based on capability of the communication apparatus itself.

17. The communication apparatus according to claim 13, wherein the at least one of the relay communication apparatus or the remote communication apparatus further multiplexes the communication via the first wireless link and the communication via the third wireless link, based on an instruction from the base station apparatus.

18. The communication apparatus according to claim 12, wherein the at least one of the relay communication apparatus or the remote communication apparatus further drops one of data transmitted via the first wireless link or data transmitted via the third wireless link, based on a specific condition and the detection of the conflict.

19. The communication apparatus according to claim 18, wherein the at least one of the relay communication apparatus or the remote communication apparatus further drops the one of the data transmitted via the first wireless link or the data transmitted via the third wireless link, based on a communication status of at least one of the communication via the first wireless link or the communication via the third wireless link.

20. The communication apparatus according to claim 19, wherein the at least one of the relay communication apparatus or the remote communication apparatus further drops the one of the data transmitted via the first wireless link or the data transmitted via the third wireless link, based on a status of usage of a buffer for the at least one of the communication via the first wireless link or the communication via the third wireless link.

21. The communication apparatus according to claim 19, wherein the at least one of the relay communication apparatus or the remote communication apparatus further drops the one of the data transmitted via the first wireless link or the data transmitted via the third wireless link, based on a number of retransmissions of the at least one of the communication via the first wireless link or the communication via the third wireless link.

22. The communication apparatus according to claim 18, wherein the at least one of the relay communication apparatus or the remote communication apparatus further determines data to be dropped, based on a priority set for at least one of the data transmitted via the first wireless link or the data transmitted via the third wireless link.

23. A communication method, comprising:
in a communication apparatus including circuitry:
performing, by the circuitry, a wireless communication;
controlling, by the circuitry, notification of information regarding a resource allocated for a communication with a first apparatus, wherein
the communication with the first apparatus is via a first wireless link,
the information is notified to a second apparatus via a second wireless link,
the communication apparatus is configured to be mobile,
the first apparatus comprises a remote communication apparatus, and
the second apparatus comprises a base station apparatus; and
controlling, by the circuitry, allocation of the resource for the communication with the first apparatus via the first wireless link, wherein the control of the allocation of the resource is based on a request from the second apparatus via the second wireless link.

24. A communication apparatus, comprising:
circuitry configured to:
perform a wireless communication; and
control notification of control information, regarding allocation of a resource for a communication with a first apparatus via a first wireless link, to a second apparatus via a second wireless link, wherein
the first apparatus comprises a remote communication apparatus that communicates with a relay communication apparatus via a third wireless link,
the relay communication apparatus is movable, and
at least one of the relay communication apparatus or the remote communication apparatus controls, in a case where a conflict is detected between the communication via the first wireless link and a communication via the third wireless link, the communication via the first wireless link and the communication via the third wireless link.

* * * * *